US011520974B2

(12) United States Patent
Sun et al.

(10) Patent No.: US 11,520,974 B2
(45) Date of Patent: Dec. 6, 2022

(54) SHARING OF USER MARKINGS BETWEEN PRINTED AND DIGITAL DOCUMENTS

(71) Applicant: Adobe Inc., San Jose, CA (US)

(72) Inventors: Tong Sun, San Ramon, CA (US); Qi Sun, Santa Clara, CA (US); Jing Qian, Westford, MA (US); Curtis Michael Wigington, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/834,940

(22) Filed: Mar. 30, 2020

(65) Prior Publication Data

US 2021/0303779 A1 Sep. 30, 2021

(51) Int. Cl.

| | |
|---|---|
| ***G06F 40/169*** | (2020.01) |
| ***G06F 40/171*** | (2020.01) |
| ***G06F 3/04842*** | (2022.01) |
| ***G06F 3/0488*** | (2022.01) |
| ***G06T 7/20*** | (2017.01) |

(Continued)

(52) U.S. Cl.

CPC .......... *G06F 40/171* (2020.01); *G06F 3/0488* (2013.01); *G06F 3/04842* (2013.01); *G06F 40/169* (2020.01); *G06F 40/197* (2020.01); *G06T 7/20* (2013.01); *G06V 10/225* (2022.01); *G06V 20/20* (2022.01); *G06V 30/418* (2022.01); *G06T 2207/30176* (2013.01)

(58) Field of Classification Search

CPC .... G06F 40/169; G06F 40/171; G06F 40/197; G06F 3/04842; G06F 3/0488; G06K 9/2063; G06K 9/00483; G01S 19/13; G06V 10/225; G06V 20/20; G06V 30/418; G06T 7/20; G06T 2207/30176

See application file for complete search history.

(56) References Cited

U.S. PATENT DOCUMENTS

| | | | | |
|---|---|---|---|---|
| 6,385,351 | B1 * | 5/2002 | Simske .............. | H04N 1/40062 382/311 |
| 8,156,115 | B1 | 4/2012 | Erol et al. | |

(Continued)

OTHER PUBLICATIONS

Bodomo, A. et al., "Some students still read books in the 21st century: A study of user preferences for print and electronic libraries", Nov. 2003, The Reading Matrix 3, vol. 3, 16 pages.

(Continued)

*Primary Examiner* — Kyle R Stork

(74) *Attorney, Agent, or Firm* — Finch & Maloney PLLC

(57) ABSTRACT

Techniques are disclosed for sharing user markings between digital documents and corresponding physically printed documents. The sharing is facilitated using an Augmented Reality (AR) device, such as a smartphone or a tablet. The device streams images of a page of a book on a display. The device accesses a corresponding digital document that is a digital version of content printed on the book. In an example, the digital document has a digital user marking, e.g., a comment associated with a paragraph of the digital document, wherein a corresponding paragraph of the physical book lacks any such comment. When the device streams the images of the page of the book on the display, the device appends the digital comment on the paragraph of the page of the book within the image stream. Thus, the user can view the digital comment in the AR environment, while reading the physical book.

20 Claims, 23 Drawing Sheets

(51) Int. Cl.

| | |
|---|---|
| ***G06F 40/197*** | (2020.01) |
| ***G06V 10/22*** | (2022.01) |
| ***G06V 20/20*** | (2022.01) |
| ***G06V 30/418*** | (2022.01) |

(56) References Cited

U.S. PATENT DOCUMENTS

| | | | | |
|---|---|---|---|---|
| 9,026,900 | B1 | 5/2015 | Pugh | |
| 9,645,978 | B2 | 5/2017 | Frem et al. | |
| 10,706,278 | B2 | 7/2020 | Marda et al. | |
| 10,720,082 | B1 | 7/2020 | Hutabarat et al. | |
| 2002/0133628 | A1 | 9/2002 | Asplund et al. | |
| 2002/0138476 | A1 | 9/2002 | Suwa et al. | |
| 2005/0078871 | A1 | 4/2005 | Pollard et al. | |
| 2005/0138382 | A1 | 6/2005 | Hougaard et al. | |
| 2005/0268217 | A1 | 12/2005 | Garrison | |
| 2007/0237378 | A1 | 10/2007 | Reiner | |
| 2008/0177764 | A1 | 7/2008 | Kise et al. | |
| 2010/0262659 | A1 | 10/2010 | Christiansen et al. | |
| 2010/0329555 | A1 | 12/2010 | Chapman et al. | |
| 2011/0249299 | A1 | 10/2011 | Wu et al. | |
| 2011/0307832 | A1 | 12/2011 | Audet | |
| 2012/0105475 | A1* | 5/2012 | Tseng | G01S 19/13 345/633 |
| 2012/0105487 | A1 | 5/2012 | Son et al. | |
| 2013/0024418 | A1 | 1/2013 | Sitrick et al. | |
| 2014/0229865 | A1 | 8/2014 | Da Costa et al. | |
| 2014/0253701 | A1 | 9/2014 | Wexler et al. | |
| 2015/0325051 | A1 | 11/2015 | Bhuruth | |
| 2016/0049010 | A1 | 2/2016 | Hinski | |
| 2016/0274686 | A1* | 9/2016 | Alonso Ruiz | G06F 3/04883 |
| 2017/0116784 | A1 | 4/2017 | Hintermeister et al. | |
| 2017/0220546 | A1 | 8/2017 | Codrington et al. | |
| 2018/0081519 | A1* | 3/2018 | Kim | G06F 3/011 |
| 2018/0139204 | A1 | 5/2018 | Votaw et al. | |
| 2018/0373770 | A1 | 12/2018 | Switzer et al. | |
| 2019/0019022 | A1* | 1/2019 | Marda | G06K 9/00483 |
| 2019/0043302 | A1 | 2/2019 | Lyons et al. | |
| 2020/0364294 | A1* | 11/2020 | Brown | G06F 40/263 |

OTHER PUBLICATIONS

Guimbreiere, F. "Paper augmented digital documents", Nov. 2003, In Proceedings of the 16th annual ACM symposium on User interface software and technology, ACM, 10 pages.

Holman, D. et al., "Paper windows: interaction techniques for digital paper", Apr. 2005, CHI 2005 Papers, ACM, 9 pages.

Klamka, K. and R. Dachselt, "IllumiPaper: Illuminated interactive paper", May 2017, CHI 2017, ACM, 14 pages.

Li, Z. et al., HoloDoc: Enabling Mixed Reality Workspaces that Harness Physical and Digital Content, May 2019, CHI 2019, ACM, 14 pages.

Liao, C. et al., "Pacer: fine-grained interactive paper via camera-touch hybrid gestures on a cell phone", Apr. 2010, CHI 2010, ACM, 10 pages.

Pu, M. et al., "Framework based on Mobile Augmented Reality for Translating Food Menu in Thai Language to Malay Language", 2017, International Journal on Advanced Science, Engineering and Information Technology, vol. 7, 7 pages.

Singer, LM and PA Alexander, "Reading across mediums: Effects of reading digital and print texts on comprehension and calibration", Mar. 2016, The journal of experimental education 2016, vol. 0, 18 pages.

U.S. Appl. No. 16/842,607, filed Apr. 7, 2020, 84 pages.

Uchiyama, Hideaki, Julien Pilet, and Hideo Saito. "On-line document registering and retrieving system for AR annotation overlay." Proceedings of the 1st Augmented Human International Conference. Apr. 2010. (Year: 2010).

Holland, Tom, and Aaron Quigley. "MobARDoc: Mobile Augmented Printed Documents." In Proceedings of UbiComp, pp. 26-29. 2011. (Year: 2011).

You J, Zhou Z, Gao W., Demo: Mobile AR live annotation for printed materials. InSIGGRAPH ASIA 2016 Mobile Graphics and Interactive Applications Nov. 28, 2016 (pp. 1-2). (Year: 2016).

D. Xie, Z. Zhou and J. Wu, "D-Note: Computer-Aided Digital Note Taking System on Physical Book," 2011 Sixth International Conference on Image and Graphics, Hefei, Anhui, 2011, pp. 963-968, doi: 10.1109/ICIG.2011.44. (Year: 2011).

* cited by examiner

304

404a

Device 100

Page 11 exerting an attractive force on all objects exerting an attractive force on all objects Assuming a spherically symmetrical planet, the strength of this field at any given point above the surface is proportional to the planetary body's mass and inversely proportional to the square of the distance from the center of the body The strength of the gravitational field is numerically equal to the acceleration of objects under its influence

*Newton*

Relation to the Universal Law

Newton's law of universal gravitation states that there is a gravitational force between any two masses that is equal in magnitude for each mass, and is aligned to draw the two masses toward each other. The formula is $$F = G\, m_1 \times m_2 / r^2$$

where $m_1$ and $m_2$ are any two masses, G is

Page 10

Gravity

Gravity (from Latin gravitas, meaning...

...gravitation, is a ...by which all things —including planets, even light - are ...avitate toward) one ...vity gives weight to ...the Moon's gravity ...s. The gravitational ...nal gaseous matter ...e caused it to begin ...stars—and for the ...er into galaxies—so ...e for many of the ...s in the Universe ...range, although its ...asingly weaker on ...body (including the ...led by its own ...which can be ...ewtonian physics as Display screen 142

Live video stream of the book 304 on the display screen 142

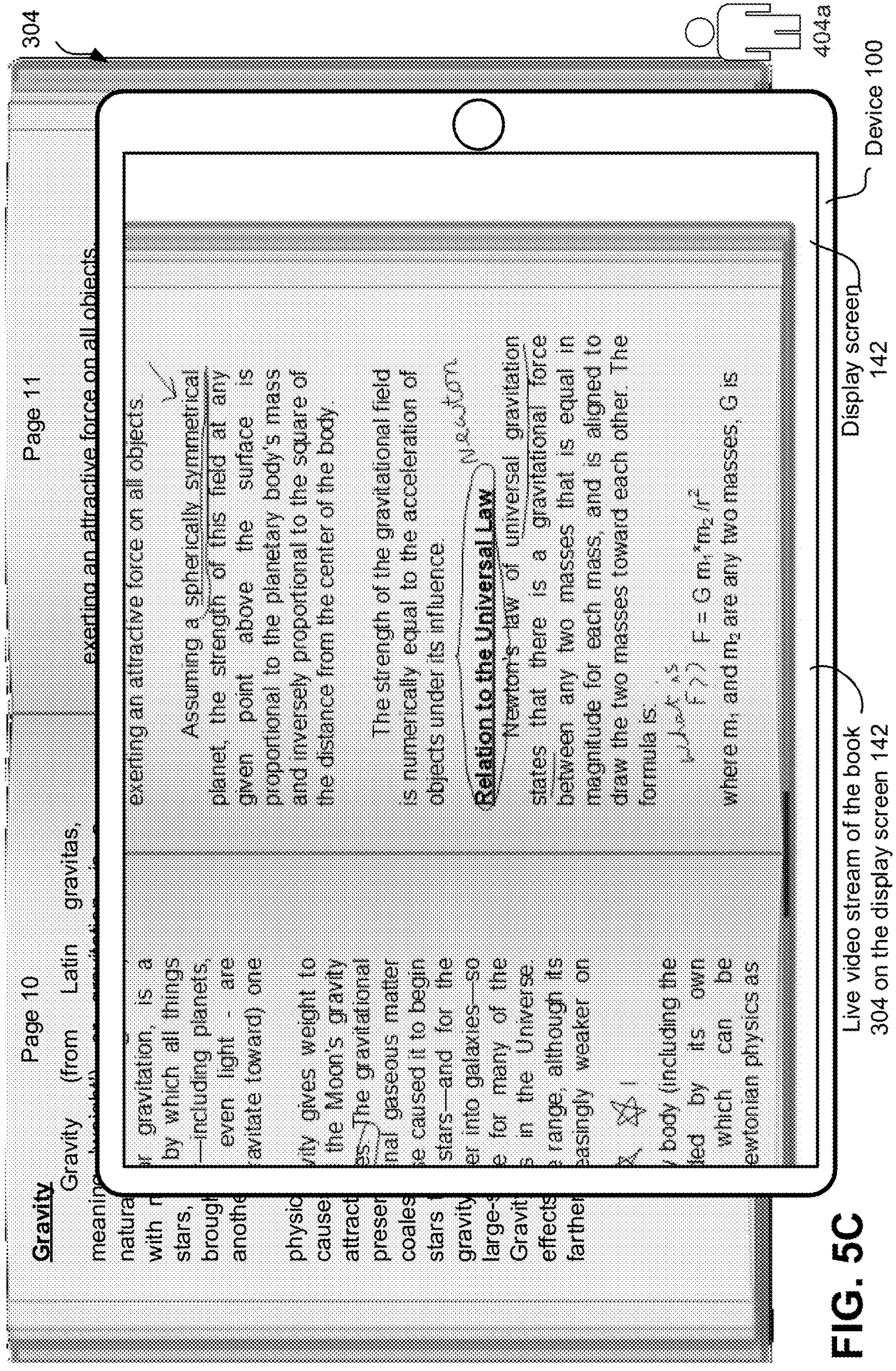

SHARING OF USER MARKINGS BETWEEN PRINTED AND DIGITAL DOCUMENTS

FIELD OF THE DISCLOSURE

This disclosure relates generally to digital document processing, and more specifically to sharing of user markings between printed documents and corresponding digital documents.

BACKGROUND

Document consumption has become multimodal and asynchronous, with respect to the digital and physical domains. For example, a user may scroll through chapters or otherwise consume content in a digital version of a book at one time, and later continue reading a physical printed version of the same book. In either case, the user may annotate the book. For instance, while reading the digital version of the book, the user can add various user markings, such as annotations, highlights, underlines, edits, etc. Similar markings can be made in the printed version of the book. However, when the user reads one version of the marked-up book, the markings in the other version are effectively missing or otherwise unavailable for access.

Similarly, such user markings can be shared among multiple users in a cloud-storage based environment. In particular, user markings made by a first user on a digital book are viewable and/or editable by a second user remote to the first user but having access to a copy of the marked-up digital book. However, such remote sharing of user markings between multiple users is not readily achievable in physical domain.

Thus, the convenience of consuming multimodal content (content that exists in both digital and printed form) has not extended to sharing of user markings between these two modes. This disconnection impairs the ability for robust sharing, storing, and searching of independently created digital and physical user markings.

BRIEF DESCRIPTION OF THE DRAWINGS

FIGS. 5A, 5B, 5C illustrate a setup in which a printed version of content of a physical book is viewed as image on a computing device, in accordance with some embodiments of this disclosure.

DETAILED DESCRIPTION

Figure 1:
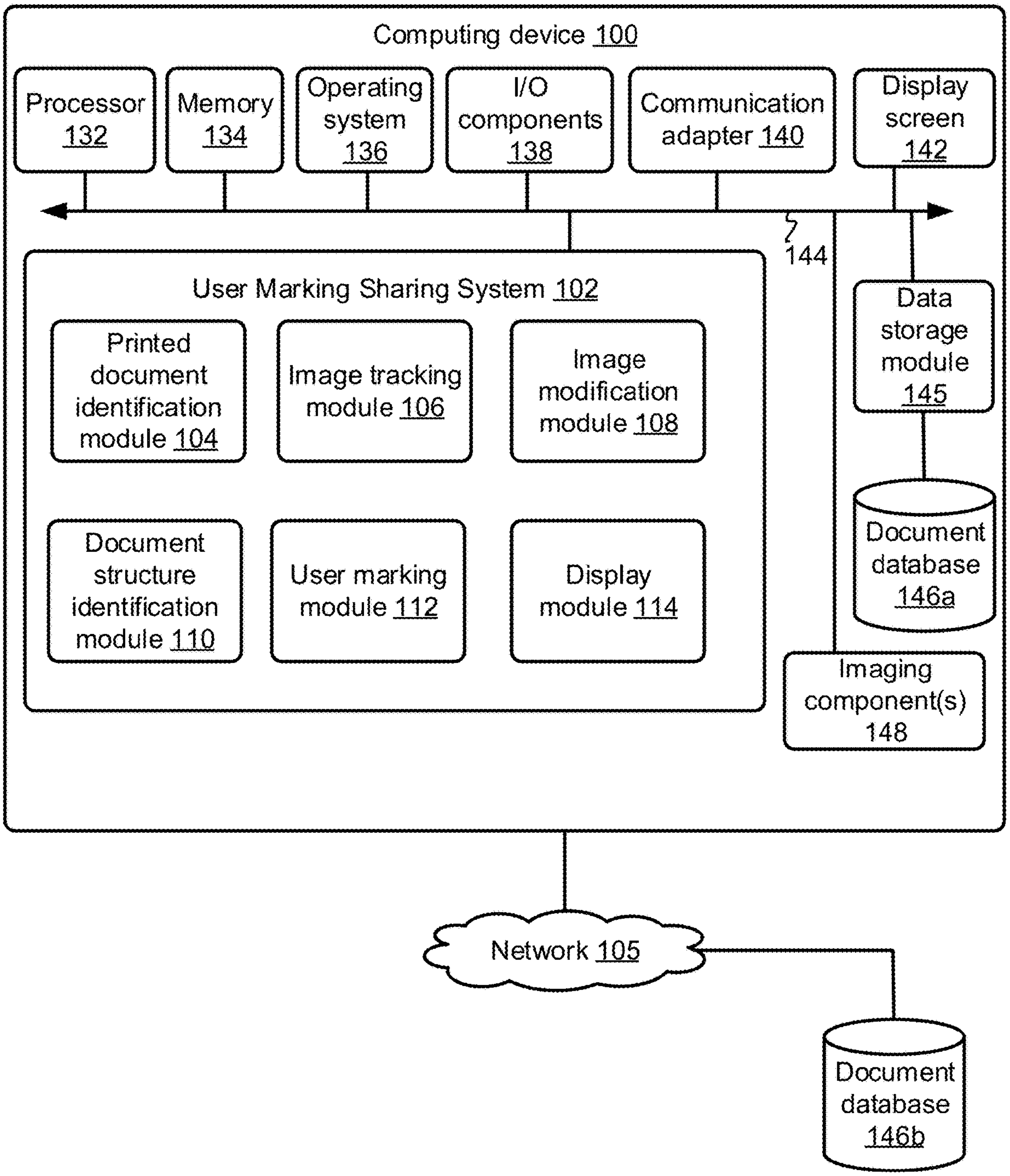
FIG. 1 is a block diagram schematically illustrating selected components of an example computing device configured to share and/or synchronize user markings independently provided in both digital and physical versions of consumable content, in accordance with some embodiments.

Techniques are disclosed for sharing and/or synchronizing digital and physical (hand-written) user markings associated with respective digital and printed versions of the same content. The techniques can be implemented using readily available devices, such as smartphones, tablets, laptops, or other such devices that include a camera and a display. In an example use case, a user may read a physical book at one time and scribble or otherwise provide physical user markings on pages of the book, and may at some other time read a digital version of the same book and generate digital user markings on the digital version. In more detail, an imaging component of a device is used to capture a stream of images of physical content such as a page of a book, and the images are displayed on a touch screen display of the device. The device accesses a corresponding digital version of the physical content. In an example where the content is a book, assume for instance that the digital version of the book has a digital user marking, such as a comment associated with a paragraph of the digital document. Further assume that a corresponding paragraph of the physical book lacks any such comment. When the device streams the images of the page of the book on the display, the device appends or superimposes the digital comment on the paragraph captured within the image stream. Thus, the user can now effectively view the digital comment in an augmented reality (AR) environment, while reading the physical book and also viewing any physical user marking on the physical book. This allows a user to simultaneously view digital user markings and physical user markings in the common platform of the AR environment. In some embodiments, the AR environment also allows the user to add new digital comments, while the user is viewing images of the physical book in the AR environment. In some embodiments, the user can also digitize one or more physical user markings provided on the physical book to corresponding digital user markings. Numerous embodiments and variations will be apparent in light of this disclosure.

General Overview

As previously noted, document consumption has become multimodal, where a user consumes both digital and printed versions of a given content, and possibly provides markings in one or both versions. In general, there is no easy way to share, synchronize, and/or to simultaneously view (i) the digital user markings created digitally by one or more users in the digital version, and (ii) physical user markings provided by hand by one or more users on the printed version. Existing techniques include digitizing handwritten notes with the use of special handheld devices, special papers, or special ink to digitally record such annotations. In one such example case, a special printer is employed to overprint a digital pattern to a physical page. Then, a digital pen is used to collect a user's strokes, as the user marks annotations with the digital pen. These strokes are then shared with a database, and can be rendered in the digital documents. This allows a transfer of physical annotations to the digital world. Another existing technique uses projection of images to overlay digital context onto a physical paper. However, such projection needs some user marked regions on the physical paper, for the projection to function. Another existing technique uses a digital pen to augment digital content with a physical document. For example, if the digital pen scans a sentence on the physical paper, the relevant digital content will be displayed. Unfortunately, each of these techniques uses unique devices, such as head-mounted displays, special papers, special inks, printers, and hence, are burdensome or otherwise not readily adoptable or amenable for wide scale use.

Thus, techniques are provided herein that facilitate sharing and synchronization of physical and digital user markings. Although the techniques are useful in any number of content consumption applications, they are particularly useful in generating an AR environment on standard electronic devices, such as smartphones, laptops, tablets, AR headsets, or any such devices that include a camera and a display. In any such cases, the techniques can be used to facilitate viewing of digital highlights, digital annotations, or other digital user markings generated in a digital document simultaneously with physical user markings hand-scribbled or otherwise previously provided on a physical document, as well as the creation of new digital user markings. In some such example embodiments, the techniques leverage a cloud-based document structure extraction algorithm, to facilitate a real-time user experience in generating and synchronizing digital user markings, while viewing live image stream of a printed version on a touch screen display. Numerous use cases will be apparent, particularly with respect to synchronizing and sharing markings.

For example, in one such example use case, a display screen of a computing device simultaneously displays live real-time images of the physical document (such as a book or other printed document), with digital user markings superimposed on the images. The real-time images are captured by a camera of the computing device. The superimposed digital user markings may be from the user and/or other users that have also consumed that document. At any given time, the user can update or add new physical markings by scribbling or writing on the physical book. Likewise, the user can also update or add new digital markings as well, using a user interface of the computing device. In some embodiments, the device can also identify physical user markings, and convert them into digital user markings. The computing device is programmed or otherwise configured (such as by a plug-in application executable within the device) to manage such edited or new digital user markings. For instance, in some embodiments such management includes storing the digital user markings along with (or separate from) the digital document, either in a local database or in a cloud-based remote database. Such stored digital marks can thus be retrieved and superimposed on the physical version of the document, whether by user that made those marks or other users that are also consuming that document. Note that the digital user markings can be from multiple users, such as when a cloud-based digital platform is used to share and synchronize digital user markings.

User markings, as used herein, refer to any marking created or caused by a user on a document, when the user is reading or otherwise consuming the document. Examples of user markings include, but are not limited to, annotations, comments, notes, highlights, underlines, edits, and/or strikethroughs. Note that user markings may be, for example, in the margin or white space of the given content, and/or on the given content. User markings are not present in the original unmarked document, but can be created by the user, as desired, in either of the digital or physical domains.

Digital user markings, as used herein, refer to any user markings that are associated with a digital document. A digital user marking can be created digitally by a user for a digital document, and stored along with (or separate from) the digital document. For example, when a user is reviewing a digital document, the user can digitally highlight one or more words of the digital document, add a written or voice comment or annotation for one or more sections of the digital document, underline a sentence, and/or the like. Note that a digital user marking can be originated in the digital domain, or originated in the physical domain and then transferred into the digital domain by converting the physical marking to a digital marking.

A physical user marking is created manually by a user on a physical document, such as a printed paper or a book, using a physical drawing medium, such as a pen, a pencil, a highlighter, a charcoal, a marker, or another appropriate physical drawing medium. For example, when a user is reading a physical book, the user can add a note on the margin, a highlight, an underline or a strikethrough, and/or write anything on the pages of the physical book. Note that in some cases, the user may create a physical mark on a sticky note and then adhere that sticky note to the physical document. In such cases, while the marking is not directly provided in the physical document, it may still be considered a physical marking in the context of the present disclosure, as will be appreciated.

In some embodiments, the device includes a system for sharing user markings. Note that, in some embodiments, at least some parts of the system may also be implemented on a remote server that is accessed by the device. In any case, the system according to some such embodiments includes a printed document identification module and an image tracking module. The printed document identification module identifies the physical document being consumed. For example, a section of a book, which is being displayed on the display screen of the device, is identified. Such identification can be done automatically by the device and/or based on receiving an input from the user, as will be discussed in turn. In some such embodiments, the printed document identification module searches a collection of digital documents to identify a digital document that matches the book. If the digital document is remotely located (e.g., is on the cloud), the device stores a local copy of the digital document.

Once the digital version of the document is identified and accessed, the image tracking module of the system maps a section of the physical book to a corresponding section of the digital version of the book. For example, assume there is an equation associated with gravitation force in both the physical book and the digital version of the book, and assume that images of the equation within the book are displayed in real-time on the device display screen. The image tracking module matches the image of this equation in the book to the corresponding equation in the digital version, and therefore establishes a markerless means to align or otherwise map a specific location in the physical book to a specific corresponding location in the digital version of the book. These matched locations are referred to herein as markerless point pairs. Numerous such markerless point pairs can be identified in the physical and digital versions of the book. Note that, given the markerless nature of such mapping, specialized markers embedded within the content are not needed. The image tracking module aligns such point pairs to effectively anchor the digital version of the book to the physical version of the book, so that the mapping is accurate even if the device moves relative to the physical book, and/or there is a change in the zooming function (such as a change in zoom level of the imaging component of the device, or a change in zoom level of the display). Thus, even if the position of the image of the equation changes on the display screen of the device, the image of the equation is still anchored and mapped to the corresponding equation in the digital version. In some embodiments, the anchoring of the mapping is achieved through a continuous or near continuous tracking of the stream of images of the book. In some embodiments, the tracking of the image of the book is achieved using Simultaneous Localization And Mapping (SLAM) and/or an appropriate object tracking algorithm, although other tracking and mapping algorithms can be used, as will be appreciated.

In some such embodiments, the image tracking module takes into account a structure of the digital version of the document, while tracking the images of the physical book. For example, the user marking sharing system comprises a document structure identification module. In some embodiments, the document structure identification module identifies a document structure of the digital version of the document. Merely as an example, the document structure identification module employs a standard document structure extraction algorithm or another appropriate segmentation algorithm suitable to identify the structure of the digital version. Thus, the document structure identification module is aware of the structure of the paragraphs, sentences, tables, equations, and images of the digital version of the document. In an example, the structure of the digital version and the physical book are similar. For example, a paragraph in the digital version has a corresponding paragraph in the physical book. Similarly, an equation in the digital version has a corresponding equation in the physical book. Being aware of the document structure of the digital version facilitates tracking the image of the physical book that is being displayed on the display screen.

In some embodiments, the system includes an image modification module which is programmed or otherwise configured to superimpose one or more digital user markings on the image stream of the printed version, and to cause display of the superimposed image stream of the printed version on the display screen of the device. Thus, now the image stream displayed on the display screen of the device displays both (i) images of the physical book, including one or more physical user markings scribbled or otherwise provided on the physical book, and (ii) one or more digital user markings that are superimposed on the images of the physical book. This provides the user with simultaneous views of both the physical user markings and the digital user markings on the display screen of the device.

In some embodiments, the AR environment facilitated by the system can be used to easily view multiple annotations. For example, assume that the digital version has an equation, and multiple annotations are associated with the equation, where the multiple annotations can possibly be generated by multiple users. In some embodiments, the multiple annotations are stacked in different layers. In an example, a first layer of annotation is displayed when the device is at the distance D1 from the book, a second layer of annotation is displayed when the device is at the distance D2 from the book, a third layer of annotation is displayed when the device is at the distance D3 from the book, and so on, where D1, D2, and D3 are different distances. Thus, by moving the device relative to the book, the user is able to view multiple sets of annotations, one at a time. This allows a continuous and natural annotation viewing experience, where the user can move the device up and down to view different annotations.

In some embodiments, the system includes a user marking module programmed or otherwise configured to receive input from the user indicating new digital user markings, and create the corresponding markings. Thus, while the image stream of the book is being displayed on the display screen, the user can input one or more new digital user markings. There are a number of ways in which a user can input new digital user markings in the AR environment of the device. For example, the user draws, writes or scribbles the new digital user marking on the display screen using a finger or a stylus or other such implement suitable for providing input via a touch screen display. For example, assume that the user scribbles a note on the display screen, next to an image of an equation of the physical book. In such an example, in the digital version, the new digital user marking is stored and also associated with the corresponding equation in the digital version.

In some other embodiments, the new digital user markings can be created using a virtual cursor that system posts or otherwise causes display of on the display screen. In some such embodiments, the cursor is displayed at a fixed position on the physical display screen of the device. Thus, a location of the cursor relative to the physical display screen does not change when the user moves the device relative to the physical book. In an example, as the user moves the device relative to the physical book, the displayed positions of various sections of the book changes within the display screen. The cursor acts as a virtual marker or virtual pen, and scribblings are formed along a path of the image of the printed version passing underneath the cursor. Thus, a path of the scribble of the new digital user marking is based on how the device is being moved, relative to the physical document being imaged. Put differently, as and when the device is being moved, the image of the printed version also moves relative to the display screen. On the other hand, the cursor is at a fixed position (e.g., at a center) relative to the display screen. This generates a relative movement between the image of the printed version and the cursor. The path of the scribble of the new digital user marking is based on this relative movement, and tracks the path of the cursor over the image.

In some embodiments, the virtual cursor can also be used to make a selection of a section of the book on the image stream of the book. For example, assume that the cursor is positioned on a specific section of the image of the printed version, where the section is a paragraph. Upon the cursor hovering at that position for a period of time (e.g., 2 to 5 seconds), the entire paragraph can be highlighted or otherwise selected by the user marking module. Subsequently, a new digital user marking can be created, and be associated with a corresponding paragraph of the digital version. In some embodiments, knowledge of the document structure is used to make the selection of the entire paragraph in the above discussed example. Thus, when the cursor is over a section of the image of the book for a threshold period of time, the entire section is selected for the new digital marking. This mode of inputting new digital markings is also referred to herein as an automatic mode of creating new digital markings in the sense that an entire section of the image to be digitally marked (or otherwise associated with a new digital marking) is automatically selected, based on the cursor hovering anywhere over the section.

In contrast to the automatic mode where an entire section is selected based on the hovering of the cursor, in a semi-automatic selection mode, merely a portion of a section of the printed version can be selected using the cursor based on a movement of the cursor. For example, in the semi-automatic selection mode, the cursor can be used to select individual words, sentences, phrases, or any portion of a section of the document. A new digital user marking can then be created for the selected portion of the section of the printed version, and be associated with the corresponding portion in the digital version, as will be discussed in further details herein. In some embodiments, the cursor can also be used to select and/or activate any of a plurality of digital marking tools or menu items, as will be discussed in turn.

In some embodiments, the device identifies one or more physical user markings within the image stream of the printed version, and converts the physical user markings to corresponding digital user markings. For example, the device employs an Optical Character Reader (OCR) to read and understand hand-written comments (e.g., notes, edits, etc) within the image stream of the printed version, and converts any physical user marking to corresponding digital user marking. These digital user markings can now be stored with other digital markings associated with that content. Numerous variations and embodiments will be appreciated in light of this disclosure.

System Architecture and Example Operation

FIG. 1 is a block diagram schematically illustrating selected components of an example computing device 100 (also referred to as device 100) configured to share and/or synchronize user markings independently provided in both digital and physical versions of consumable content, in accordance with some embodiments. As can be seen, the device 100 includes a user marking sharing system 102 (also referred to as system 102) that allows the device 100 to share user markings between printed and digital versions of the same content. As will be appreciated, the configuration of the device 100 may vary from one embodiment to the next. To this end, the discussion herein will focus more on aspects of the device 100 that are related to facilitating sharing and/or synchronization of user markings between printed and digital versions of content, and less so on standard componentry and functionality typical of computing devices.

The device 100 comprises, for example, a consumer electronic device having imaging and display capabilities, such as a handheld computer, a tablet computer, a smartphone, a laptop computer, a head mounted AR device, and/or any other computing device that can capture and display images of printed documents, and superimpose digital user markings on the images, as further explained herein.

In the illustrated embodiment, the device 100 includes one or more software modules configured to implement certain functionalities disclosed herein, as well as hardware configured to enable such implementation. These hardware and software components may include, among other things, a processor 132, memory 134, an operating system 136, input/output (I/O) components 138, a communication adaptor 140, a display screen 142, data storage module 145, imaging component(s) 148, and the system 102. A bus and/or interconnect 144 is also provided to allow for inter- and intra-device communications using, for example, communication adaptor 140. Note that in an example, components like the operating system 136 and the system 102 can be software modules that are stored in memory 134 and executable by the processor 132. In another example, one or more modules of the system 102 can be implemented at least in part by hardware, such as by Application-Specific Integrated Circuit (ASIC) or microcontroller with one or more embedded routines. The bus and/or interconnect 144 is symbolic of all standard and proprietary technologies that allow interaction of the various functional components shown within the device 100, whether that interaction actually takes place over a physical bus structure or via software calls, request/response constructs, or any other such inter and intra component interface technologies, as will be appreciated.

In an example, the communication adaptor 140 of the device 100 can be implemented using any appropriate network chip or chipset allowing for wired or wireless connection to network 105 and/or other computing devices and/or resources. To this end, the device 100 is coupled to the network 105 via the adaptor 140 to allow for communications with other computing devices and resources, such as a remote document database **146*b*. The network 105 is any suitable network over which the computing devices communicate. For example, network 105** may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

A local document database 146*a* (e.g., that comprises a non-transitory computer memory) of the device 100 stores at least one or more documents. The device 100 has access to the local database 146*a* and/or a remote database 146*b*. In an example, the remote database 146*b* is a cloud-based database, where the device 100 can access the database 146*b* over the network 105. In some embodiments, the documents stored in the databases 146*a*, 146*b* include digital documents, as well as digital user markings, such as highlights, annotations, comments, underlines that are digitally added by one or more users to the digital documents. The document database 146*a* is coupled to the data storage module 145, which facilitates read and write access to database 146*a*.

Processor 132 can be implemented using any suitable processor, and may include one or more coprocessors or controllers, such as an audio processor or a graphics processing unit, to assist in processing operations of the device 100. Likewise, memory 134 can be implemented using any suitable type of digital storage, such as one or more of a disk drive, solid state drive, a universal serial bus (USB) drive, flash memory, random access memory (RAM), or any suitable combination of the foregoing. Operating system 136 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. The device 100 also includes one or more I/O components 138, such as one or more of a tactile keyboard, a display, a mouse, a touch sensitive display, a touch screen display, a trackpad, a microphone, a camera, scanner, and location services. In general, other standard componentry and functionality not reflected in the schematic block diagram of FIG. 1 will be readily apparent, and it will be further appreciated that the present disclosure is not intended to be limited to any specific hardware configuration. Thus, other configurations and subcomponents can be used in other embodiments.

The device 100 includes, or is communicatively coupled to, a display screen 142. In some embodiments, the display screen 142 is a touch screen display, as is common in many modern devices such as smart phones, tablets, notepads, and/or other mobile devices. Thus, the display screen 142 is to display content to a user, and to act as a touch screen input device to receive user input from the user. Note that the display screen 142 may also be included in the I/O components 138, but is shown separately in this example case.

The imaging components 148 comprise one or more cameras that can capture images, where the captured images are displayed on the display screen 142. In some embodiments, at least one such imaging component 148 is on a back surface of the device 100, whereas the display screen 142 is on a front surface of the device 100. Thus, the locations of the imaging component 148 and the display screen 142 allow, for example, capturing a video stream of a printed book or other physical document, and displaying the video stream in real-time (or near real-time) on the display screen 142.

As can be further seen, the user marking sharing system 102 comprises a printed document identification module 104, an image tracking module 106, an image modification module 108, a document structure identification module 110, a user marking module 112, and a display module 114. As will be appreciated, some modules may be combined with other modules but are shown here as separate to facilitate discussion. For example, when a user captures a stream of images of a printed document, the printed document identification module 104 identifies the printed document, and matches the printed document to a corresponding digital version of the printed document, as will be discussed in further details herein. In some embodiments, the image tracking module 106 tracks sections of the image of the printed document, as the image moves on the display screen 142. In some embodiments, the image modification module 108 modifies the stream of images of the printed document before displaying the stream of images on the display screen, e.g., by superimposing one or more digital user markings on the image stream. In some embodiments, the document structure identification module 110 identifies a structure of a digital document, such as identifies structure of paragraphs, texts, tables, equations, figures, etc. of the digital document. In some embodiments, the user marking module 112 facilitates input of digital user markings via the touch screen display 142, while the image stream of the printed version of the document is being displayed on the touch screen display 142. In some embodiments, the display module 114 causes display of the image stream of the printed version of the document on the touch screen display 142. Each of these components of the system 102 will be discussed in further details herein later.

The components of the system 102 can be in communication with one or more other devices including other computing devices of a user, server devices (e.g., cloud storage devices), licensing servers, or other devices/systems. Although the components of the system 102 are shown separately in FIG. 1, any of the subcomponents may be combined into fewer components, such as into a single component, or divided into more components as may serve a particular implementation.

In an example, the components of the system 102 performing the functions discussed herein with respect to the system 102 may be implemented as part of a stand-alone application, as a module of an application, as a plug-in for applications, as a library function or functions that may be called by other applications, and/or as a cloud-computing model. Thus, the components of the system 102 may be implemented as part of a stand-alone application on a personal computing device or a mobile device. Alternatively, or additionally, the components of the system 102 may be implemented in any application that allows digital content processing and displaying.

Figure 2:
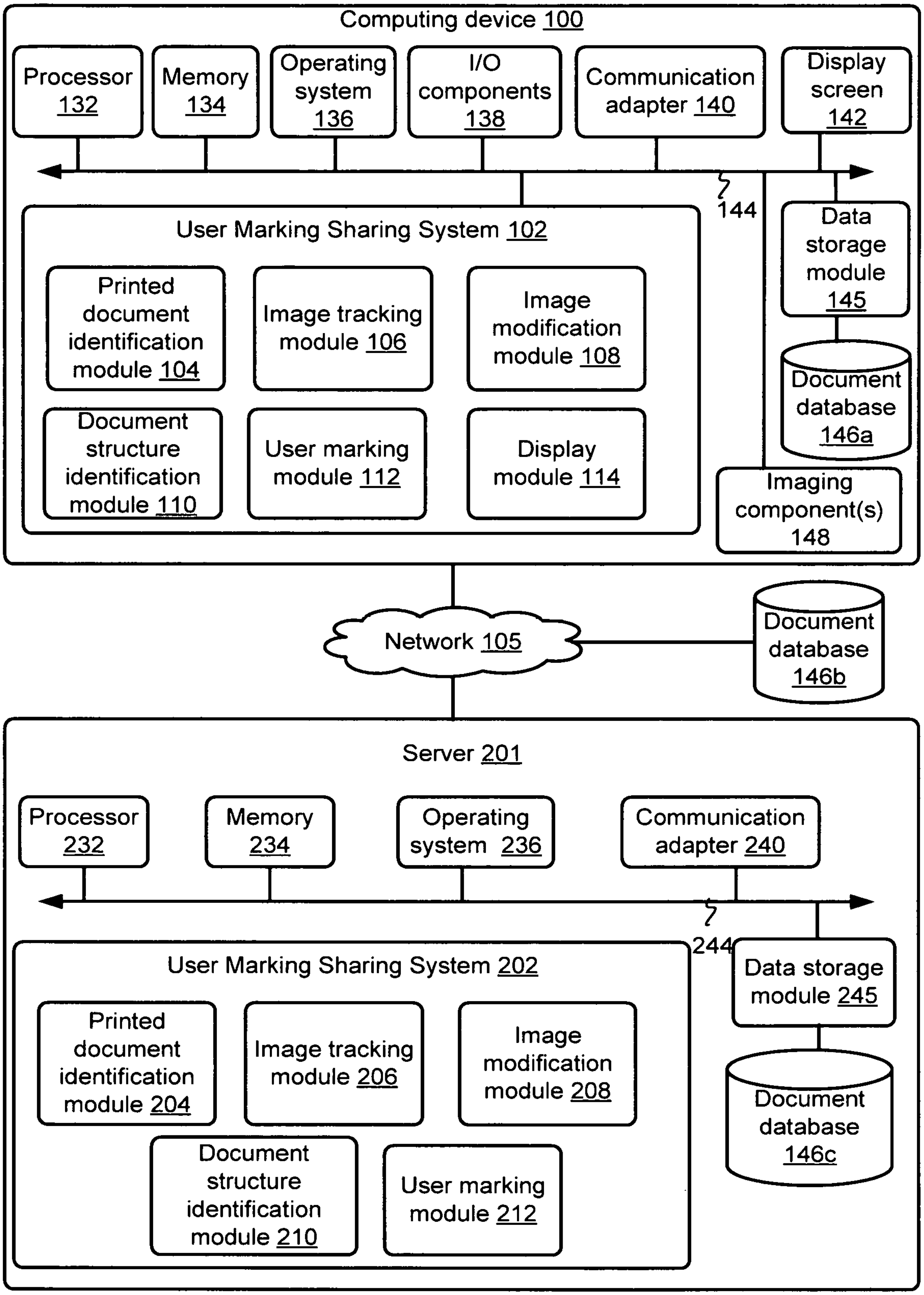
FIG. 2 is a block diagram schematically illustrating selected components of an example system comprising the computing device of FIG. 1 communicating with server device(s), where the combination of the computing device and the server device(s) are configured to share and/or synchronize user markings independently provided in both digital and physical versions of consumable content, in accordance with some embodiments.

FIG. 2 is a block diagram schematically illustrating selected components of an example system comprising the computing device 100 of FIG. 1 communicating with server device(s) 201, where the combination of the device 100 and the, server device(s) 201 (henceforth also referred to generally as server 201) are configured to share and/or synchronize physical user markings associated with physical version of content with digital user markings associated with digital version of the same content, in accordance with some embodiments.

In an example, the communication adaptor 140 of the device 100 can be implemented using any appropriate network chip or chipset allowing for wired or wireless connection to network 105 and/or other computing devices and/or resources. To this end, the device 100 is coupled to the network 105 via the adaptor 140 to allow for communications with other computing devices and resources, such as the server 201 and the document database 146*b*.

In one embodiment, the server 201 comprises one or more enterprise class devices configured to provide a range of services invoked to provide user marking sharing and/or synchronization services, as variously described herein. Although one server 201 implementation of the user marking sharing system is illustrated in FIG. 2, it will be appreciated that, in general, tens, hundreds, thousands, or more such servers can be used to manage an even larger number of documents for user marking sharing and synchronization.

In the illustrated embodiment, the server 201 includes one or more software modules configured to implement certain of the functionalities disclosed herein, as well as hardware configured to enable such implementation. These hardware and software components may include, among other things, a processor 232, memory 234, an operating system 236, a user marking sharing system 202 (also referred to as system 202), data storage module 245, and a communication adaptor 240. In an example implementation, system 202 includes a printed document identification module 204, an image tracking module 206, an image modification module 208, a document structure identification module 210, and a user marking module 212. A document database 146*c* (e.g., that comprises a non-transitory computer memory) comprises multiple documents for which user markings are to be shared and synchronized, as well as digital user markings, and is coupled to the data storage module 245. A bus and/or interconnect 244 is also provided to allow for inter- and intra-device communications using, for example, communication adaptor 240 and/or network 205. Note that components like the operating system 236 and system 202 can be software modules that are stored in memory 234 and executable by the processor 232. The previous relevant discussion with respect to the symbolic nature of bus and/or interconnect 144 is equally applicable here to bus and/or interconnect 244, as will be appreciated.

Processor 232 is implemented using any suitable processor, and may include one or more coprocessors or controllers, such as an audio processor or a graphics processing unit, to assist in processing operations of the server 201. Likewise, memory 234 can be implemented using any suitable type of digital storage, such as one or more of a disk drive, a universal serial bus (USB) drive, flash memory, random access memory (RAM), or any suitable combination of the foregoing. Operating system 236 may comprise any suitable operating system, and the particular operation system used is not particularly relevant, as previously noted. Communication adaptor 240 can be implemented using any appropriate network chip or chipset which allows for wired or wireless connection to network 205 and/or other computing devices and/or resources. The server 201 is coupled to the network 205 to allow for communications with other computing devices and resources, such as the device 100. In general, other componentry and functionality not reflected in the schematic block diagram of FIG. 2 will be readily apparent in light of this disclosure, and it will be further appreciated that the present disclosure is not intended to be limited to any specific hardware configuration. In short, any suitable hardware configurations can be used.

The server 201 can generate, store, receive, and transmit any type of digital documents, such as documents that are to be accessed by the device 100. In some embodiments, the server 201 provides document structure identification service, in which a document structure identification module 210 analyzes a document to identify its structure, and passes on such structure information to the document structure identification module 110 of the device 100. Merely as an example, the document structure identification module 210 employs a document structure extraction algorithm to identify the structure of a digital document, as will be discussed in further details herein.

In some embodiments, a printed document identification module 204 of the system 202 may search through the document database 146*b* and/or 146*c* to identify a digital document that matches a printed document, where the device 100 captures images of the printed document, as will be discussed in further details herein.

In some embodiments, the system 202 can synchronize digital user markings from multiple copies of a digital document possibly opened in multiple devices. For example, in a cloud-based multi-user scenario (e.g., as discussed with respect to FIG. 4B), copies of a digital document can be accessed by multiple users using multiple computing devices, where each user can add and/or modify digital user markings within the corresponding digital document. The system 202 can synchronize such multiple digital user markings from multiple devices and save those in a central database, such as the databases 146*b* and/or 146*c*. In some embodiments, such synchronization can be handled by the system 102 of the device 100 as well.

In some embodiments, the location of some functional modules in the system may vary from one embodiment to the next. Any number of client-server configurations will be apparent in light of this disclosure. In still other embodiments, the techniques may be implemented entirely on a user computer, e.g., simply as stand-alone user marking sharing application. Similarly, while the document database 146*a* is shown on the client side in this example case, it may be on the server side in other embodiments, such as the cloud-based document database 146*b* and/or 146*c*. Thus, the document database can be local or remote to the device 100, so long as it is accessible by the user marking sharing system that is implemented by the system 102 or implemented by the system 202.

Figure 3A:
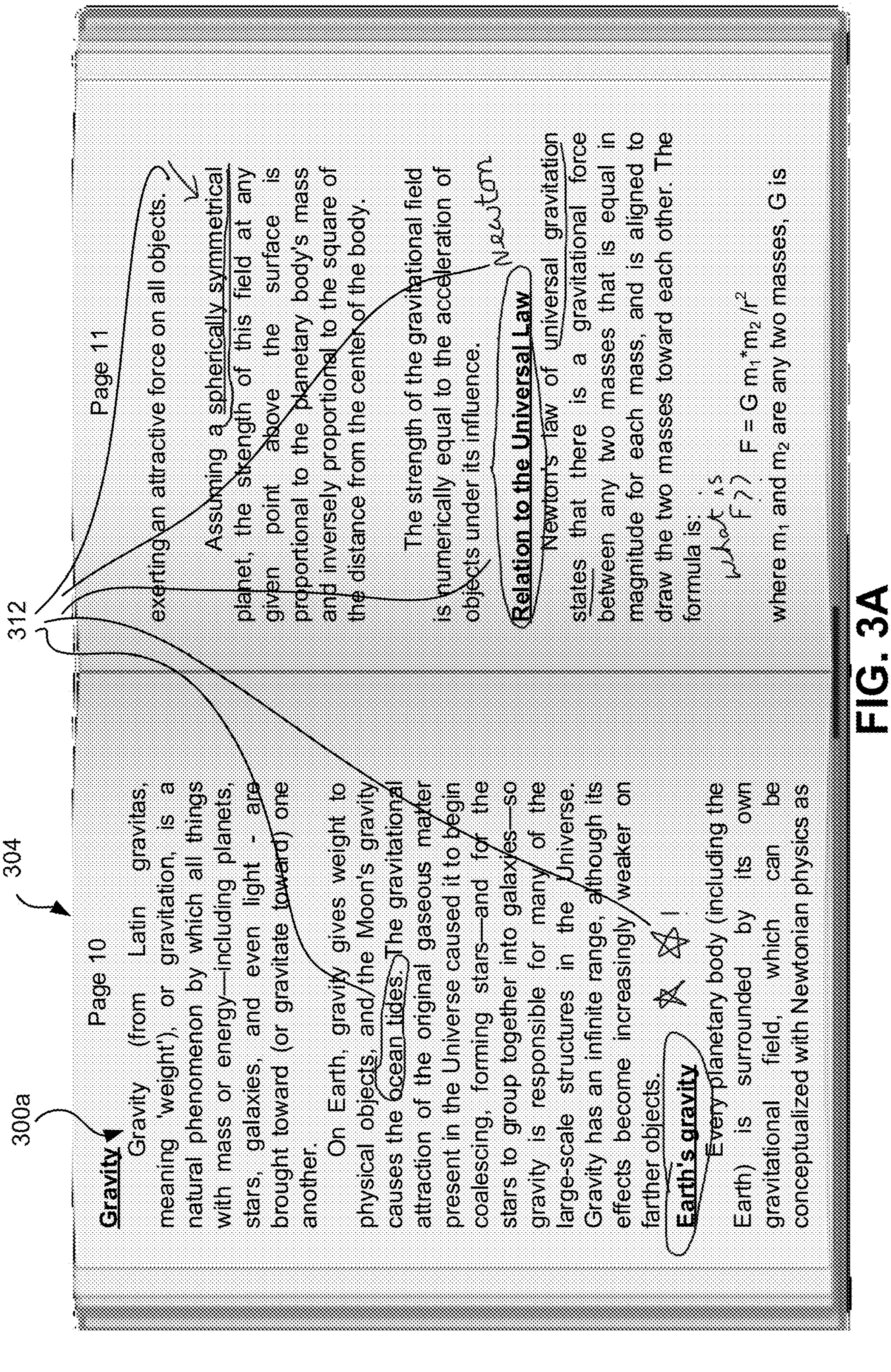
FIG. 3A illustrates a printed version of content, such as a book, which includes physical user markings.

FIG. 3A illustrates a printed version 300*a* of content, such as a physical book 304, which includes physical user markings 312, in accordance with some embodiments of this disclosure. As illustrated in FIG. 3A, the printed version 300*a* of the book 304 has hand-generated user markings 312, such as user markings written by one or more users on pages of the book 304 using any appropriate marking medium, such as a pen, a pencil, a marker, a highlighter, and/or another marking medium that can form physical marks on a page of a physical book. The hand-generated user markings 312 are, thus, physically written on the paper, and are also referred to as "physical user markings" 312. Merely as examples in FIG. 3A, physical the user markings 312 include circling the phrases "ocean tides," "Earth's gravity," and "Relation to the Universal Law"; underlining the phrase "spherically symmetrical"; putting stars and an exclamation mark near the phase "Earth's gravity"; and posing a question "What is F?" near an equation that includes a term "F."

Figure 3B:
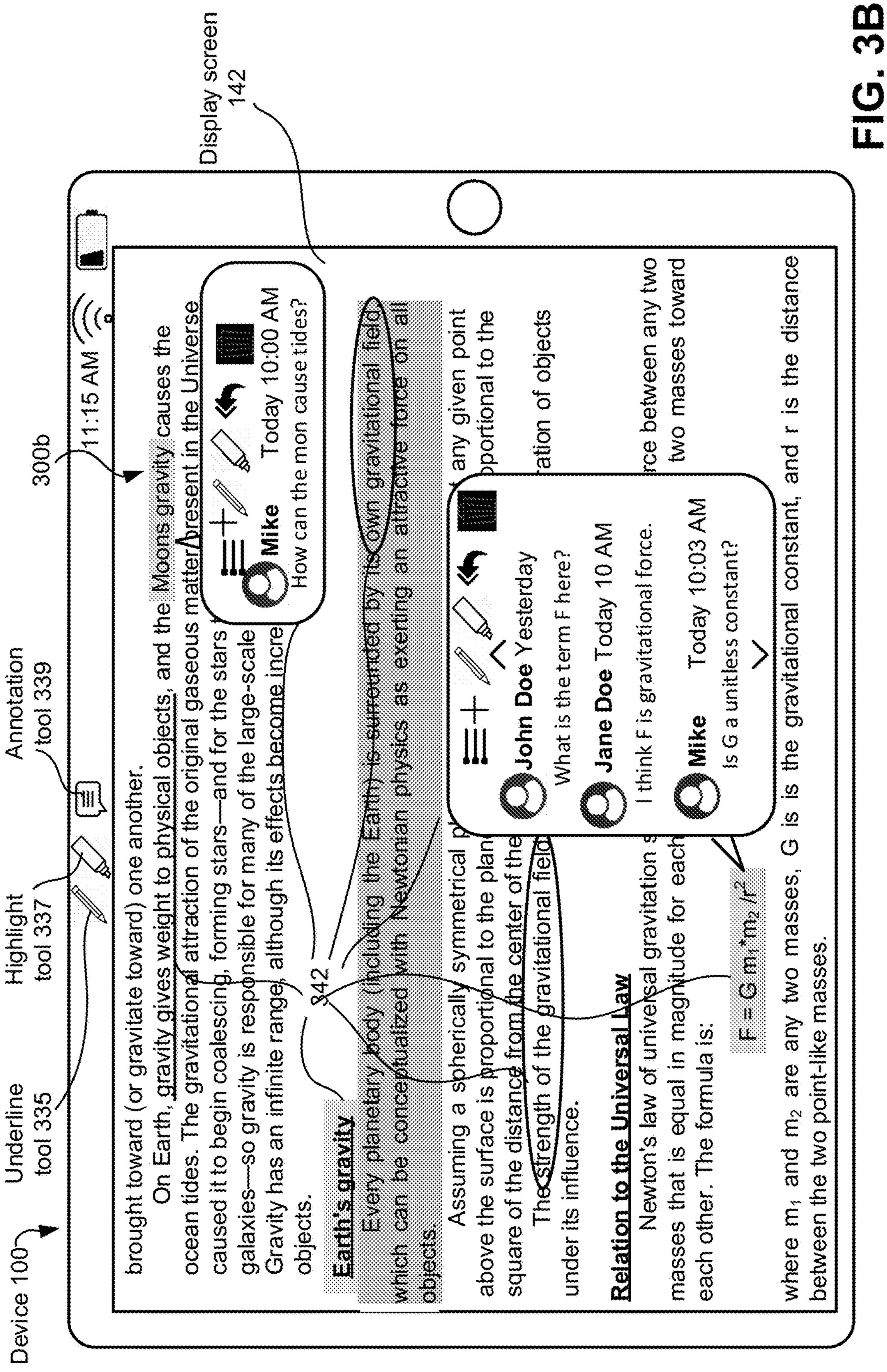
FIG. 3B illustrates a computing device having a display screen that displays a digital version of the content, such as the book of FIG. 3A, which includes digital user markings.

FIG. 3B illustrates the computing device 100 of FIGS. 1 and 2 having the display screen 142 that displays a digital version 300*b* of the same content as the printed book of FIG. 3A, where the digital version 300*b* of the content includes digital user markings 342, in accordance with some embodiments of this disclosure. As illustrated in FIG. 3B, the digital version 300*b* displayed on the display screen 142 has computer-generated digital user markings 342. In an example, the digital user markings 342 are user markings digitally generated by one or more users on the digital version 300*b* using one or more digital user marking tools available in one or more devices 100. The computer-generated user markings 342 are also referred to as "digital user markings" 342 or as "virtual user markings" 342. Merely as examples, the user markings 342 include circling the phrases "own gravitational field" and "strength of gravitation field,"; underlining the phrase "gravity gives weight to physical object"; highlighting the phase "Earth's gravity" and the following paragraph; an annotation associated with the phrase "Moons gravity," and a plurality of annotations associated with an equation.

In some embodiments, the digital version 300*b* can be any appropriate type of document, such as a Portable Document Format (PDF) document, a HyperText Markup Language (HTML) document, a word processing document, a spreadsheet, or another appropriate type of document. The digital version 300*b* of FIG. 3B and the printed version 300*a* of the book 304 of FIG. 3A include the same content—one in digital form, and the other in printed form.

In some embodiments, the device 100 comprises a user interface comprising one or more user marking tools, using which a user can add a digital user marking 342 to the digital version 300*b* of the content. Examples of such tools include an underline tool 335, a highlight tool 337, and an annotation tool 339. Note that digital user markings are not limited to merely underlining, highlight, or annotations, and any other types of user markings are possible, such as strike-through, bold, italics, adding an audio note, and/or any other appropriate type of digital user markings.

Some of the example digital user markings 342 can be generated by a user of the device 100, while some other digital user markings 342 can be generated by another user using another computing device. Examples of such multi-user environment are discussed in further detail herein, for example, with respect to FIG. 4B. As an example, referring to the annotation associated with the phrase "Moons gravity," this annotation was created by a user named Mike on the day the annotation was being displayed, at 10 AM. Mike can be the user of the device 100 illustrated in FIG. 3B, or can be another user.

As another example, referring to the annotations associated with the equation near the bottom of the page, these are examples of multi-user generated annotations. For example, a first user John added a question ("What is the term F here?"), followed by an answer by another user Jane, which is followed by another question by Mike. All comments and questions of these annotations are associated with the same equation. As illustrated, an annotation can be deleted using a delete button displayed at top right corner of the annotation box. Similarly, a new annotation can be added via the toolbox labeled as "+" at the top of the annotation box. Likewise, a user can add a reply to a comment using the reply option, or underline or highlight one or more words within the annotation box.

Figure 4A:
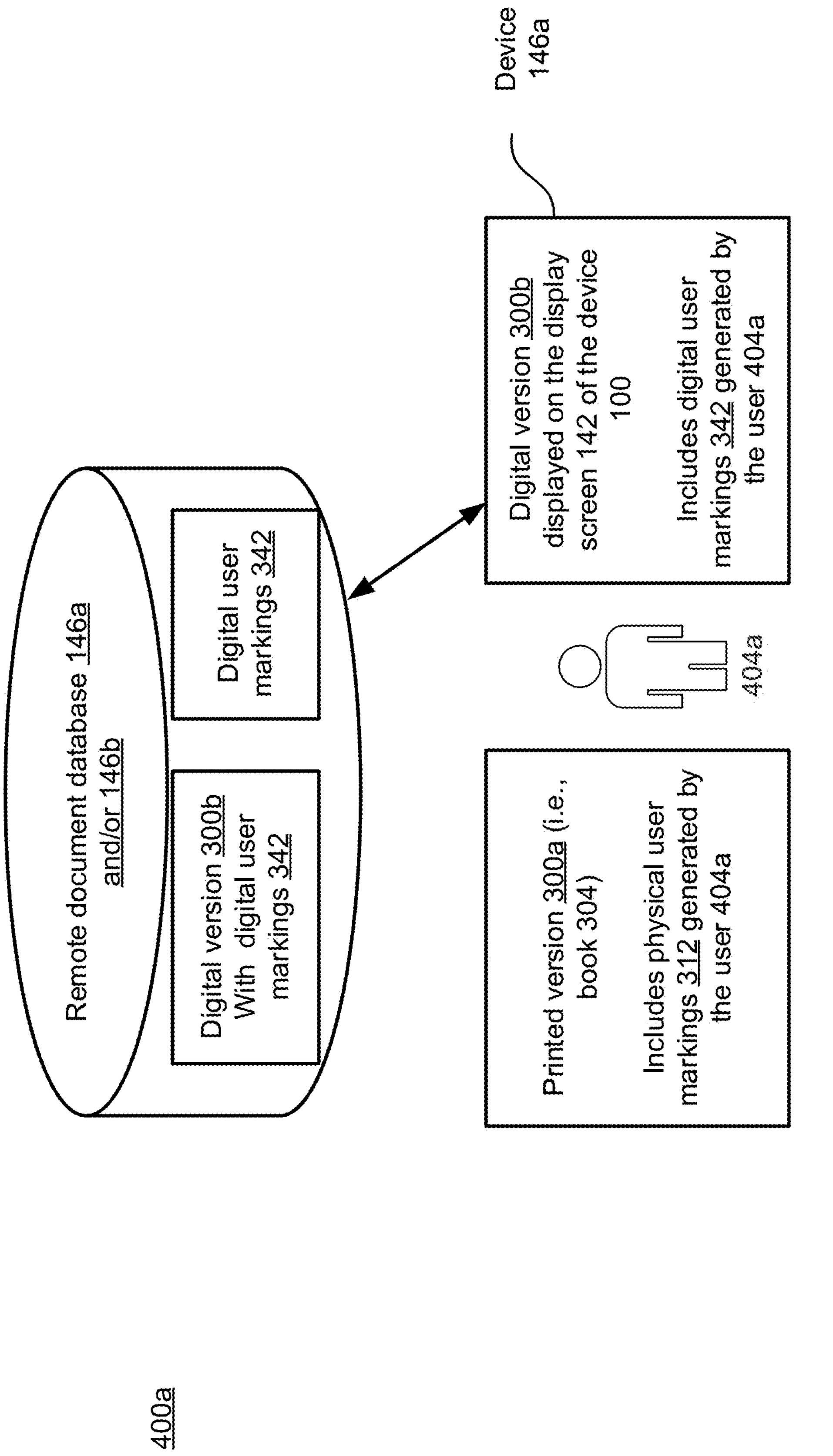
FIG. 4A illustrates a single user environment in which a printed version of content and a digital version of the content are shared by a single user, in accordance with some embodiments of this disclosure.

FIG. 4A illustrates a single user environment 400*a* in which a printed version 300*a* of content and a digital version 300*b* of the content is shared by a single user 404*a*, in accordance with some embodiments of this disclosure. The user 404*a* can, while reading the printed version 300*a* of the content, write physical user markings 312 on the printed version 300*a*, as discussed with respect to FIG. 3A.

The digital version 300*b* of the content is displayed on the display screen 142 of the device 100. The digital version 300*b* of the content is stored in an appropriate storage location, such as the local document database 146*a* in the device 100 and/or in the remote (such as cloud-based) document database 146*b* that the device 100 accesses via the network 105. The user 404*a*, while reading the digital version 300*b* of the content on the device 100, appends digital user markings 342 on the digital version 300*b*, as discussed with respect to FIG. 3B.

In an example, the digital user markings 342 are saved along with the digital version 300*b*. In another example, the digital user markings 342 are saved separately from the digital version 300*b*. Both options are illustrated in FIG. 4A.

Figure 4B:
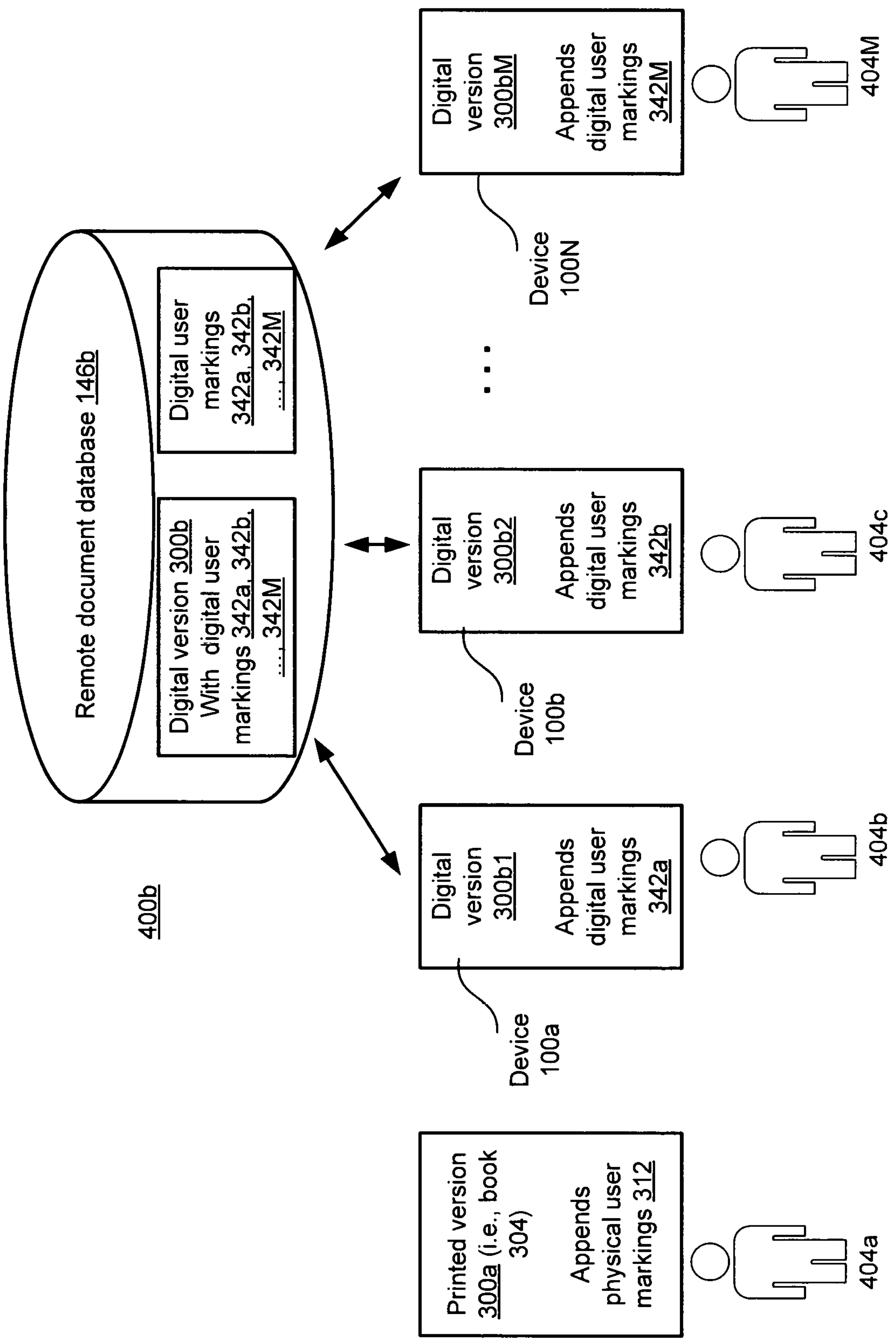
FIG. 4B illustrates a multi-user environment in which a printed version of content and a corresponding digital version of the content are shared by multiple users, in accordance with some embodiments of this disclosure.

FIG. 4B illustrates a multi-user environment 400*b* in which a printed version 300*a* of content and a corresponding digital version 300*b* of the content is shared by multiple users 404*a*, 404*b*, 404*c*, . . . , 404M, where M is an appropriate positive integer greater than 1, in accordance with some embodiments of this disclosure. Merely as an example, the user 404*a*, while reading the printed version 300*a* of the content, writes physical user markings 312 on the printed version 300*a*, as discussed with respect to FIG. 3A.

In the environment 400*b*, individual users 404*b*, 404*c* have access to the digital version 300*b* of the content. For example, the digital version 300*b* is stored in a central storage location, such as the remote document database 146*b*. A user can access the digital version 300*b* using a corresponding computing device 100 of FIG. 1 or 2. Merely as an example, in FIG. 4B, the user 404*b* is illustrated to access a copy of the digital version 300*b*1 using device 100*a*, the user 404*c* is illustrated to access a copy of the digital version 300*b*2 using the device 100*b* the user 404M is illustrated to access a copy of the digital version 300*b*M using the device 100N, and so on. In some embodiments, a device 100 accesses the digital version 300*b* of the content from the database 146*b*, and displays the digital version 300*b* of the content on associated display screen 142. For example, the device 100 caches a local copy of the digital version 300*b*, and displays the local copy on the corresponding display screen 142.

In some embodiments, individual users can append corresponding digital user markings 342 on the digital version 300*b* displayed on the corresponding device 100. For example, the user 404*a* appends digital user markings 342*a* on the digital version 300*b*1 displayed on the corresponding device 100*a*, the user 404*b* appends digital user markings 342*b* on the digital version 300*b*2 displayed on the corresponding device 100*b*, and so on. Any digital user marking 342 made by a user is eventually stored in the digital version 300*b* on the remote document database 146*b*. For example, the user 404*a* can add a comment to a specific section of the digital version 300*b*1 of the content, and user 404*b* can reply to the comment, as illustrated in FIG. 3B. For example, as discussed with respect to FIG. 3B, the user John asks about a term "F" in an equation, and user Jane provides an answer to that. User Mike asks another question about the same equation. Thus, in the environment 400*b*, the digital user markings 342, such as annotations and highlights appended by one or more users, are shared among multiple users.

In some embodiments, an online server, such as the server 201, is used to synchronize user-created digital user markings 342*a*, 342*b*, 342M. Because the environment 400*b* of FIG. 4B is designed for multiple users, in some embodiments, an online cloud-based database can be used to store the user-created digital user markings 342*a*, 342*b*, 342M.

Thus, in an example, the digital user markings 342 are saved with the digital version 300*b*. In another example, the digital user markings 342 are saved separately from the digital version 300*b*. Both options are illustrated in FIG. 4B.

As will be discussed herein in further detail, when a user first uses the device 100 to view an image stream of the physical version 300*a* printed on the book 304, digital user markings 342 (if any) are loaded from the database 146*b* to the device 100, and are superimposed on the image stream of the physical version 300*a*. If and when the user makes a new digital user marking in the AR environment, the new digital user marking is saved to the remote database. Because the device 100 may not always be connected to the network 105 (such as the Internet), the device is programmed or otherwise configured (such as by a plug-in application executable within the device) to manage such edited or new digital user markings. For instance, in some embodiments such management includes storing the digital user markings along with (or separate from) the digital document, either in a local database or in a cloud-based remote database. Whenever network connectivity is resumed, the digital user markings stored in the local database and the cloud-based remote database are synchronized.

Figure 5B:
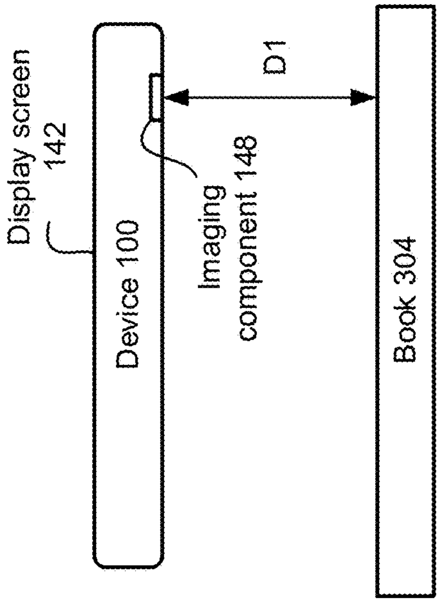
Figure 5A:
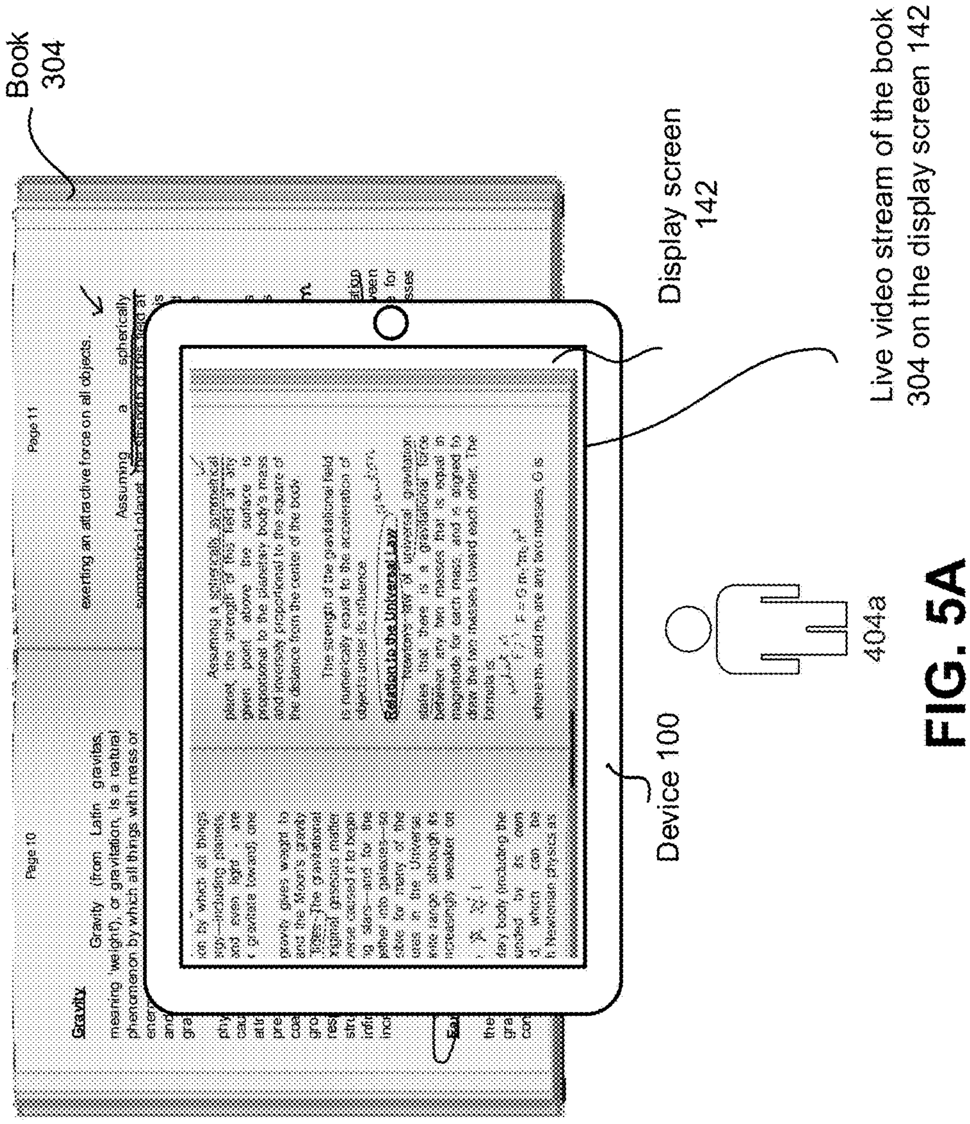

FIGS. 5A, 5B, 5C illustrate a setup in which the printed version 300*a* of the content printed on the book 304 is viewed as image on the computing device 100, in accordance with some embodiments of this disclosure. FIG. 5C illustrates a magnified view of the display screen 142 of the device 100 in the setup. FIG. 5B schematically and symbolically illustrates the computing device 100, having the display screen 142 on a first side (e.g., front side) of the device 100, and the imaging component 148 on a second side (e.g., back side) of the device 100. The imaging component 148 is, for example, a camera that can capture still and video images. In the example of FIG. 5B, the device 100 is placed at a displace D1 from the book 304, such that a user can capture images of the book 304 using the imaging component 148. As illustrated in FIG. 5A, an image stream of the printed version 300*a* of the content printed on the book 304 is displayed in real-time or near real-time on the display screen 142. The section of the pages of the book 304 that are displayed on the display screen 142 can be controlled by, for example, moving the book 304 relative to the device 100, controlling the distance D1, controlling the zoom function of the imaging component 148, and/or by controlling a zoom or magnification function of the display screen 142.

Thus, merely as an example where the computing device 100 is a cell phone or a tablet, in FIGS. 5A-5C, the user 404*a* views live images of the printed version 300*a* of the content (which is printed on the book 304) on the display screen of the cell phone or the tablet.

Figure 6:
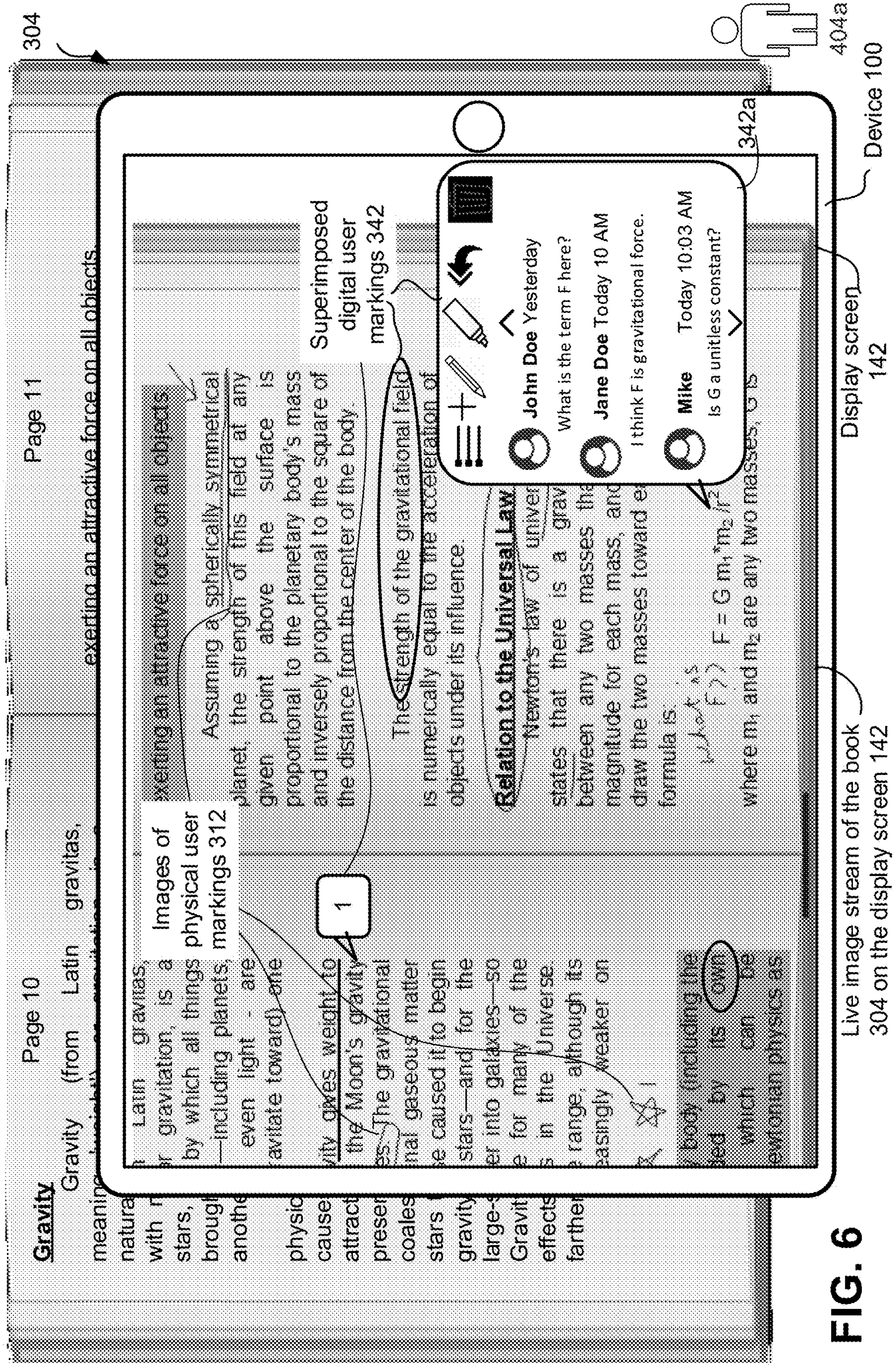
FIG. 6 illustrates real-time superimposition of digital user markings from a digital version of content on one or more images of corresponding printed version of the content displayed on a display screen of a computing device, in accordance with some embodiments of the present disclosure.

FIG. 6 illustrates real-time superimposition of digital user markings 342 from the digital version 300*b* of content on images of corresponding printed version 300*a* of the content displayed on the display screen 142 of the device 100, in accordance with some embodiments of the present disclosure. FIG. 6 will be discussed in further details with respect to FIGS. 7A, 7B.

Figure 7A:
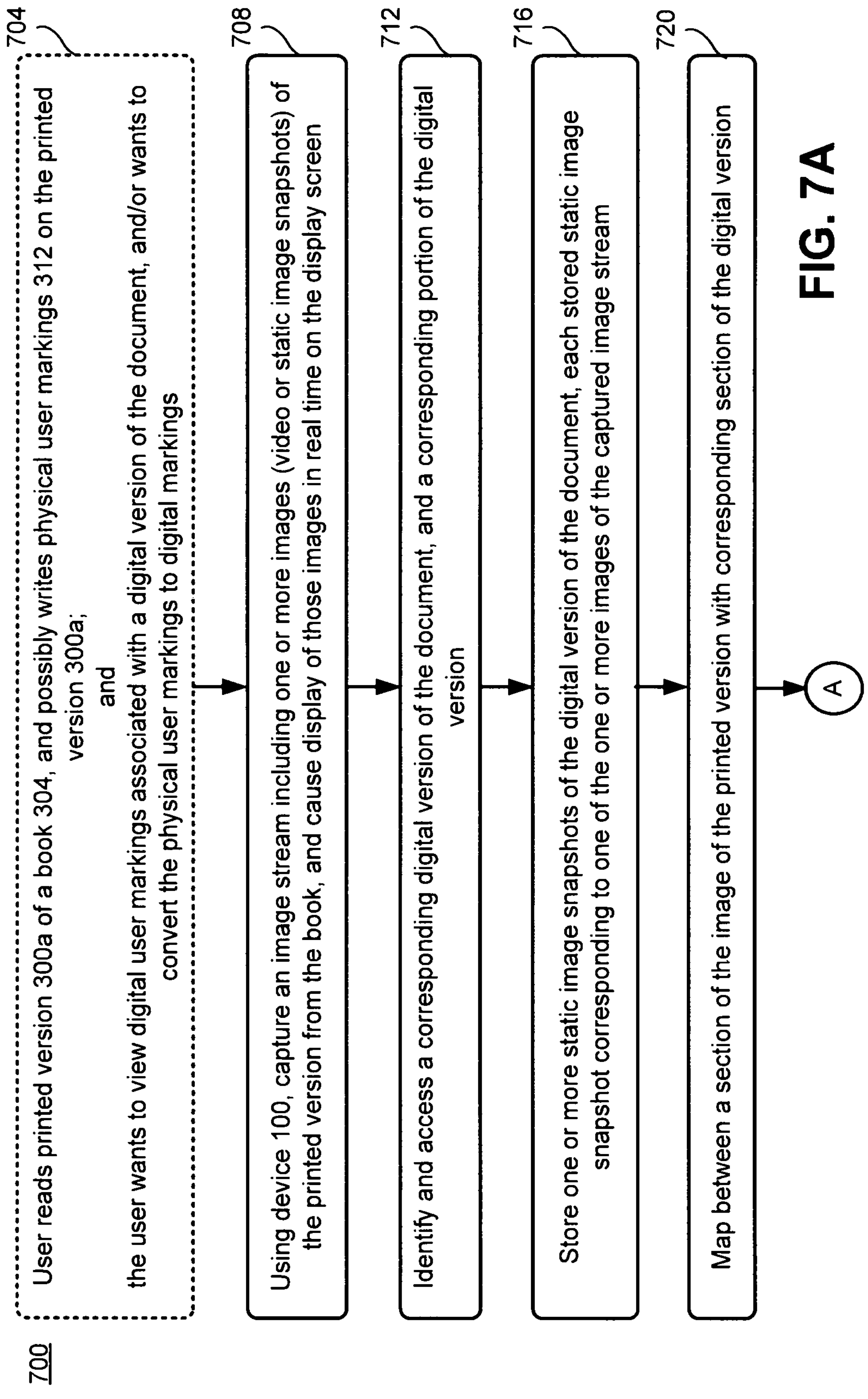
FIGS. 7A-7B are flowcharts collectively illustrating an example method for real-time superimposition of digital user markings from a digital version of content on images of corresponding printed version of the content displayed on a display screen of a computing device, in accordance with some embodiments of the present disclosure.
Figure 7B:
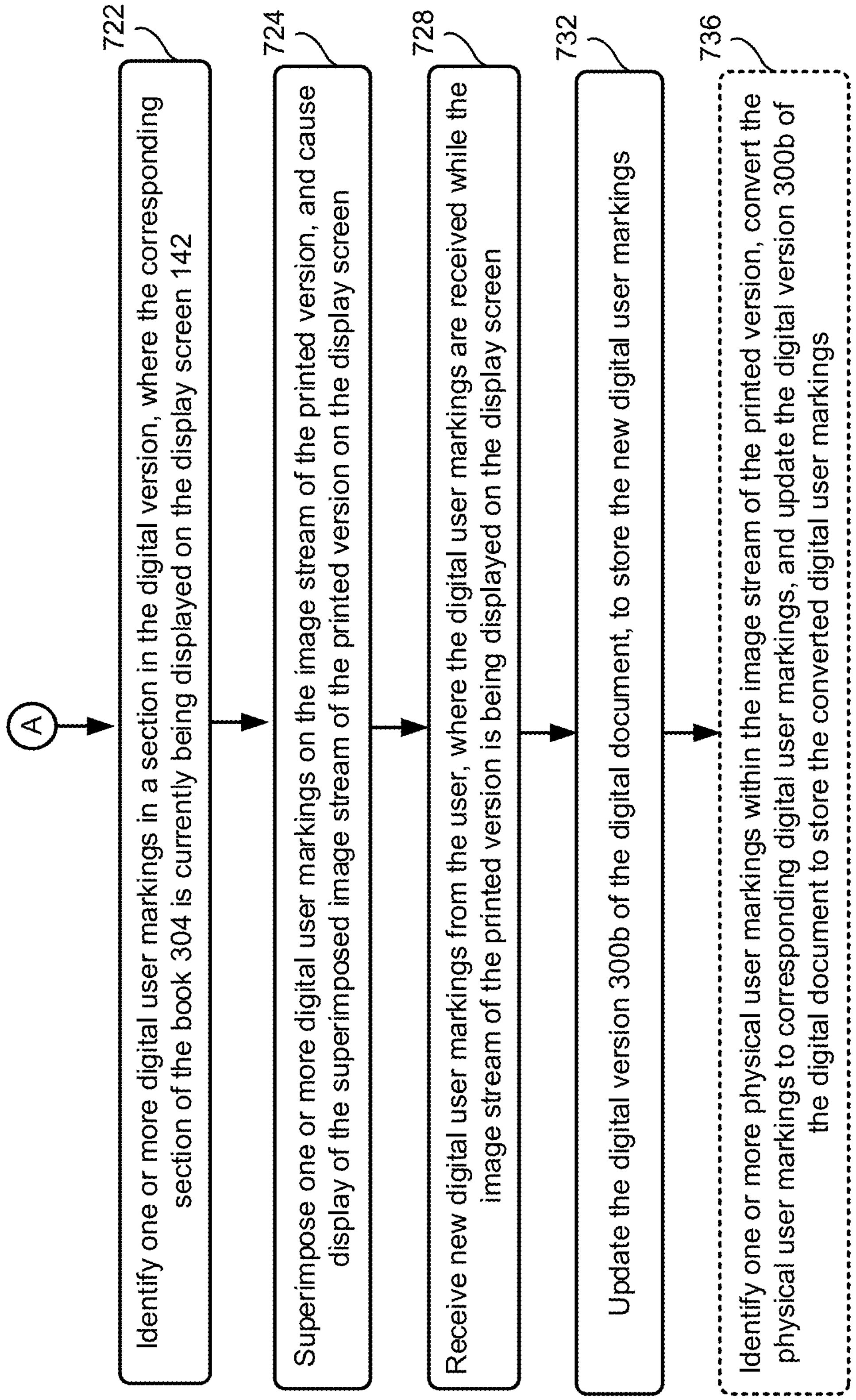

FIGS. 7A-7B are flowcharts illustrating an example method 700 for real-time superimposition of digital user markings 342 from the digital version 300*b* of content on images of corresponding printed version 300*a* of the content displayed on the display screen 142 of the device 100, in accordance with some embodiments of the present disclosure. Method 700 can be implemented, for example, using the system architecture illustrated in FIGS. 1 and/or 2, and described herein, e.g., using the systems 102 and/or 202. However other system architectures can be used in other embodiments, as apparent in light of this disclosure. To this end, the correlation of the various functions shown in FIGS. 7A, 7B to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system.

In FIG. 7A, the block 704 illustrated in dotted lines depict actions taken by a user, such as the user 404*a* of FIG. 6. Because the actions in block 704 are performed by the user 404*a*, and not by the systems 102 and/or 202, the block 704 is illustrated in dotted line.

At 704, the user 404*a* reads the printed version 300*a* of the document that is printed on the book 304, and possibly writes or otherwise provides physical user markings 312 on the printed version 300*a*, as discussed with respect to FIG. 3A. In an example, the user wants to view digital user markings associated with the digital version of the document, and/or wants to convert the physical user markings 312 to corresponding digital user markings. For example, when reading the book 304, the user has a question regarding an equation, as indicated by the physical user marking "What is F??" illustrated in FIG. 3A. To possibly get an answer to the question, the user 404*a* may want to view the associated digital user markings, in case one or more other users have uploaded a digital annotation including an answer to the question.

The method 700 then proceeds to 708, where the device 100 captures a stream of images of the printed version 300*a* from the book 304, and causes to display the images in real-time on the display screen 142. Thus, for example, a live video feed of the book 304 is displayed on the display screen 142 of the device 100, as discussed with respect to FIGS. 5A and 5C. In another example, static image snapshots of the book 304 are captured. For example, the imaging component 148 captures the images, and the display module 114 causes display of the images on the display screen 142. It may be noted that, as discussed herein, a live or a real-time (or near real-time) display of a stream of image on the display screen 142 of the device 100 does not necessarily mean that the images are displayed on the display screen 142 with exactly zero time-delay, as will be appreciated. There may be some latency or delay involved (e.g., less than 0.05 second, 0.1 second, 0.5 second, 1 second, or 2 seconds), but usually such latency or delay is not noticeable to an average user, and does not cause dissatisfaction to an average user.

The method 700 proceeds from 708 to 712, where the device 100 identifies and accesses a corresponding digital version 300*b* of the document. For example, the printed document identification module 104 and/or the printed document identification module 204 identify the printed version 300*a* of the document. For example, a section of the printed version 300*a* of the document, which is being displayed on the display screen 142, is identified. Such identification can be done automatically by the device 100 and/or based on receiving an input from the user.

For example, when the image stream of the printed version 300*a* is being displayed on the display screen 142, the device 100 identifies various identifiers associated with the physical version 300*a*, such as words, phrases, paragraphs, structure, and/or other attributes or identifiers of the printed version 300*a*. The printed document identification module 104 and/or the printed document identification module 204 compares the identifiers of the printed version 300*a* with one or more digital documents that are accessible to the device 100. For example, the user 404*a* can previously setup a library or collection of digital documents that are stored in the database 146*a* and/or the database 146*b*, or otherwise accessible to the device 100. In some embodiments, when the image stream of the printed version 300*a* is being displayed, the device 100 and/or the server 201 search the collection of digital documents to identify a digital document that matches the printed version 300*a*.

In some other embodiments, the user can help in locating the digital document that matches the printed version 300*a*. For example, the user can input identification information of the file containing the matching digital document. In another example, the user can input identification information of a collection of files, at least one of which contains the matching digital document. In yet another example, the user can display a cover of the book 304 to the device 100, where the cover includes a name of the book, an author, or the like, based on which the device 100 can search for the digital document that matches the printed version 300*a*. In yet another example, the user can input other identification information, such as an International Standard Book Number (ISBN) or a bar code associated with the book 304, based on which the device 100 and/or the server 201 can search for the digital document that matches the printed version 300*a*.

Also at 712, once the digital version of the document is identified and accessed, a portion of the digital version, which corresponds to the portion of the book 304 being currently imaged, is also identified. For example, the pages of the book 304 currently being imaged is about gravity, and the same section of gravity is identified in the digital version.

The method 700 then proceeds from 712 to 716, where one or more static image snapshots of the digital version 300*b* of the document are stored and cached in the device 100. For example, each stored static image snapshot corresponds to one of the one or more images of the captured image stream of the book 304.

At 720, the image tracking module 106 maps between a section of the printed version 300*a* of the document with a corresponding section of the digital version 300*b* of the document. For example, referring to FIG. 6, displayed near the bottom section of the page is an equation. The image tracking module 106 maps the image of this equation in the printed version 300*a* to a corresponding equation in the digital version 300*b*.

The image tracking module 106 also tracks the image stream of the printed version 300*a*, and anchors the above discussed mapping, so that the mapping is accurate even if the book 304 moves relative to the device 100, there is a change in the zooming of the imaging component 148, and/or there is a change in the zooming of the display screen. Thus, even if the position of the image of the equation changes on the display screen 142, the image of the equation is still anchored and mapped to the corresponding equation in the digital version 300*b*.

In some embodiments, the fixing or anchoring of the mapping is achieved through a continuous or near continuous tracking of the stream of images of the printed version 300*a*. In an example, the tracking is done on a 60 Hz (Hertz) basis, such that the tracking is updated about 60 times per second, although the tracking can be updated with another appropriate periodicity. For example, the tracking rate can be same as a display refresh rate of the display screen 142, such that any change in the position of a section of the image is tracked by the image tracking module 106.

In some embodiments, the tracking of the image of the printed version 300*b* is achieved using one or more tracking algorithms. For example, in some embodiments, Simultaneous Localization And Mapping (SLAM) and/or an object tracking algorithm can be used to track the image of the printed version 300*b*. As will be explained in turn, a SLAM can be used for tracking an object relative to other objects in the field of view, while an object tracking algorithm can be used for tracking the absolute location of an object within the field of view. In more detail, SLAM is the computational problem of constructing or updating a map of an unknown environment, while simultaneously keeping track of an agent's relative location within that environment. In some such embodiments, the SLAM tracks the local environment displayed on the display screen 142, where the local environment includes the image of the book 304 and a background scene comprising one or more background objects that are near the book 304. For example, if the book 304 is on a table and there is a nearby pen on the table as well, the SLAM tracks the images of the book 304, the table, and the pen. Put differently, the SLAM tracks various objects, including the book 304, displayed on the display screen. Thus, using SLAM, the device 100 knows how and when the book 304 moves relative to the background scene comprising the table and pen (or any other fixed background objects). For example, if the user moves the device 100 and/or the book 304 so that the entire book 304 is out of view of the imaging component 148, the SLAM tracking can keep track of where the book 304 is, relative to the objects that remain in the field of view of imaging component 148. For example, if a pen is displayed on the display screen 142, SLAM knows that the book 304 is likely to be on left side of the pen, although the book 304 is not currently displayed on the display screen 142.

In some embodiments, in addition to (or instead of) the SLAM, an appropriate object tracking algorithm is employed, which as noted above tracks the absolute location of a specific object, such as the book 304 or contents of the book 304, within the local environment displayed on the display screen 142. As an example, when a digital highlight is to be superimposed on a word within the image of the printed version 300*b*, the tracking has to be relatively accurate, such that the highlight is precisely on the section of the image displaying the word, and not partially on that section or on content of an adjacent section—such precise tracking can be achieved using a standard object tracking algorithm programmed or otherwise configured to perform absolute tracking.

On the other hand, if an annotation is at or near an edge of a page of the book 304 and the user moves the device 100 and/or the book 304 so that the annotation is out of view of the imaging component 148, the SLAM tracking generally keeps track of where the annotation within the book 304 is likely to be relative to objects that remain in the field of view, because the SLAM is aware of the location and/or orientation of the book 304 relative to the local environment. Similarly, if the user moves the device 100 and/or the book 304 so that the entire book 304 is out of view of the imaging component 148, the SLAM tracking keeps track of where the book 304 is likely to be, because the SLAM is aware of the location and/or orientation of the book 304 relative to the local environment.

Thus, the image tracking module 106 employs one or more tracking techniques, whether it be SLAM-based relative tracking and/or absolute tracking algorithms, or another appropriate tracking and mapping algorithm to update the mapping of the images of the printed version 300*a* displayed on the display screen, and anchoring the mapping between an image of the printed version 300*a* displayed on the display screen and the corresponding cached snap shot of the digital version 300*b* of the document, so that digital markings can be accurately placed within the images of the printed version 300*a*.

In some embodiments, the image tracking module 106 takes into account a structure of the digital version 300*b* of the document, while tracking the images of the printed version 300*a* of the document. For example, document structure identification modules 110 and/or 210 can identify a document structure of the digital version 300*b* of the document. Merely as an example, the document structure identification modules 110 and/or 210 employ a document structure extraction algorithm or another appropriate algorithm to identify and segment the structure of the digital version 300*b*. In some such embodiments, the document structure identification modules 110 and/or 210 executes a cloud-based segmentation process on the stream of images of the printed version 300*a* and is thus also aware of the structure of the paragraphs, sentences, tables, equations, and images of the digital version 300*b* of the document. For example, the document structure identification module 110 is aware of position, size, and length properties of titles, text lines, paragraphs, figures, tables in both the printed and digital version of the document. In some embodiments, the document structure identification modules 110 and/or 210 employ a local or cloud-based standard deep neural network trained to recognize and segment the document structure of input images. For example, a pre-trained deep neural network can be used to recognize and segment images of the printed version 300*a* in real-time so as to identify the structure of that document. In some other embodiments, the document structure identification modules 110 and/or 210 employ a local or cloud-based standard deep neural network trained to recognize and segment the document structure of the digital version, and rely on the document structure of the digital version to recognize and segment the document structure within images of the printed version 300*a*. As discussed, the document structure identification module can be implemented in the device 100 (such as the module 110), and/or can be cloud-based (such as the module 210).

In still other example embodiments, the document structure may already be known, such as in the case where structure of the document is saved in the document file itself (e.g., in the form of metadata, such as tags and field names or other such given structural indicators). For example, based on the manner in which a PDF document is generated, the document structure can be embedded in the PDF file itself, in which case the document structure identification module 110 can simply access the document structure stored in the PDF file, rather than performing online segmentation to acquire the structure as discussed above. In cases where the document structure information is not included in the document of interest, the document structure identification modules 110 and/or 210 can be used to generate the document structure from the file, as explained above.

In an example, the structure of the digital version 300*b* and the printed version 300*a* of the document are similar. For example, a paragraph in the digital version 300*b* has a corresponding paragraph in the printed version 300*a*. Similarly, an equation in the digital version 300*b* has a corresponding equation in the printed version 300*a*, and so on. Being aware of the document structure of the digital version 300*b* facilitates the image tracking module 106 to better track the image of the printed version 300*a* of the document that is being displayed on the display screen 142.

In some embodiments, to track the image stream of the printed version 300*a* and map the digital and printed versions, the image tracking module 106 finds a location of the digital version that matches the image stream of the printed version. Subsequently, the image tracking module 106 applies an image transformation to the image stream. For example, because of bends and creases in the book, a manner in which the user holds the book, and/or other such factors, an image in the image stream of the three-dimensional (3D) printed version may have to be transformed to map to the two-dimensional (2D) digital version. Especially for a thicker book, when the book is opened and displays two consecutive pages, each page is not exactly parallel to the horizon. For example, some section of the page may be closer to the imaging component 148 compared to some other section of the page. Accordingly, in an image of the image stream of the book, not all texts within the page would have exactly the same font size, and there can be some level of deformity in at least some sections in the images. In some embodiments, the image tracking module 106 applies the image transformation to the image stream, to cure or at least reduce such deformities. Once the image transformation is applied, the image tracking module 106 uses the document structure of the digital version 300*b* to map to the transformed images in the 3D space. Thus, this enables the image tracking module 106 to track and map the structural contents of the printed version 300*a* (such as texts, images, tables, paragraphs, equations, and/or other structures) to corresponding structural contents in the digital version 300*b*.

The method 700 then moves from block 720 in FIG. 7A to block 722 in FIG. 7B. At 722, the user marking module 112 identifies one or more digital user markings in a section in the digital version, where the corresponding section of the book 304 is currently being displayed on the display screen 142. For example, as illustrated in FIG. 6, one or more digital user markings 342 are identified.

The method 700 then moves from block 722 to block 724, where the device 100 (e.g., the image modification module 108 and/or the image modification module 208) superimposes one or more digital user markings on the image stream of the printed version 300*a*, and causes display of the superimposed image stream of the printed version on the display screen 142. For example, as illustrated in FIG. 6, one or more digital user markings 342 are superimposed on the image of the printed version 300*a* displayed on the display screen 142. A digital user marking can be superimposed on or near the corresponding section in the image of the printed version 300*a*.

Thus, now the image stream displayed on the display screen 142 displays both (i) images of the printed version 300*a*, including one or more physical user markings 312, and (ii) one or more digital user markings 342 that are superimposed on the images of the printed version 300*a*. This provides the user 404*a* with simultaneous access to both the physical user markings 312 and the digital user markings 342 on the same display screen 142.

It may be noted that a digital user marking 342 from the digital version 300*b* is anchored to a corresponding position on the image of the printed version 300*a*. For example, referring to FIG. 3B, the phrase "strength of the gravitational field" is encircled using a digital user marking 342. Now referring to FIG. 6, the user marking is superimposed on the image stream, such that the superimposed user marking 342 encircles the same phrase "strength of the gravitational field" in the image of the printed version 300*a* on the display screen 142.

Similarly, referring to FIG. 3B, there is a digital user marking 342 (e.g., collection of annotations or comments) associated with the equation at the bottom of the page. Now referring to FIG. 6, the same digital user marking is superimposed on the image stream, such that the collection of annotations is associated with the same equation in the image of the printed version 300*a* on the display screen 142.

Similarly, in FIG. 3B, the paragraph occurring after the heading "Earth's gravity" is highlighted in the digital version 300*b*. Now referring to FIG. 6, the paragraph occurring after the heading "Earth's gravity" is also highlighted in the image of the printed version 300*a* on the display screen 142, although the actual printed version 300*a* printed on the book 304 does not have any such highlights.

Thus, in FIG. 6, a digital user marking 342 is anchored or superimposed at a specific position in the image of the printed version 300*a*, where the specific position corresponds to the original position of the digital user marking 342 in the digital version 300*b*.

Figure 8:
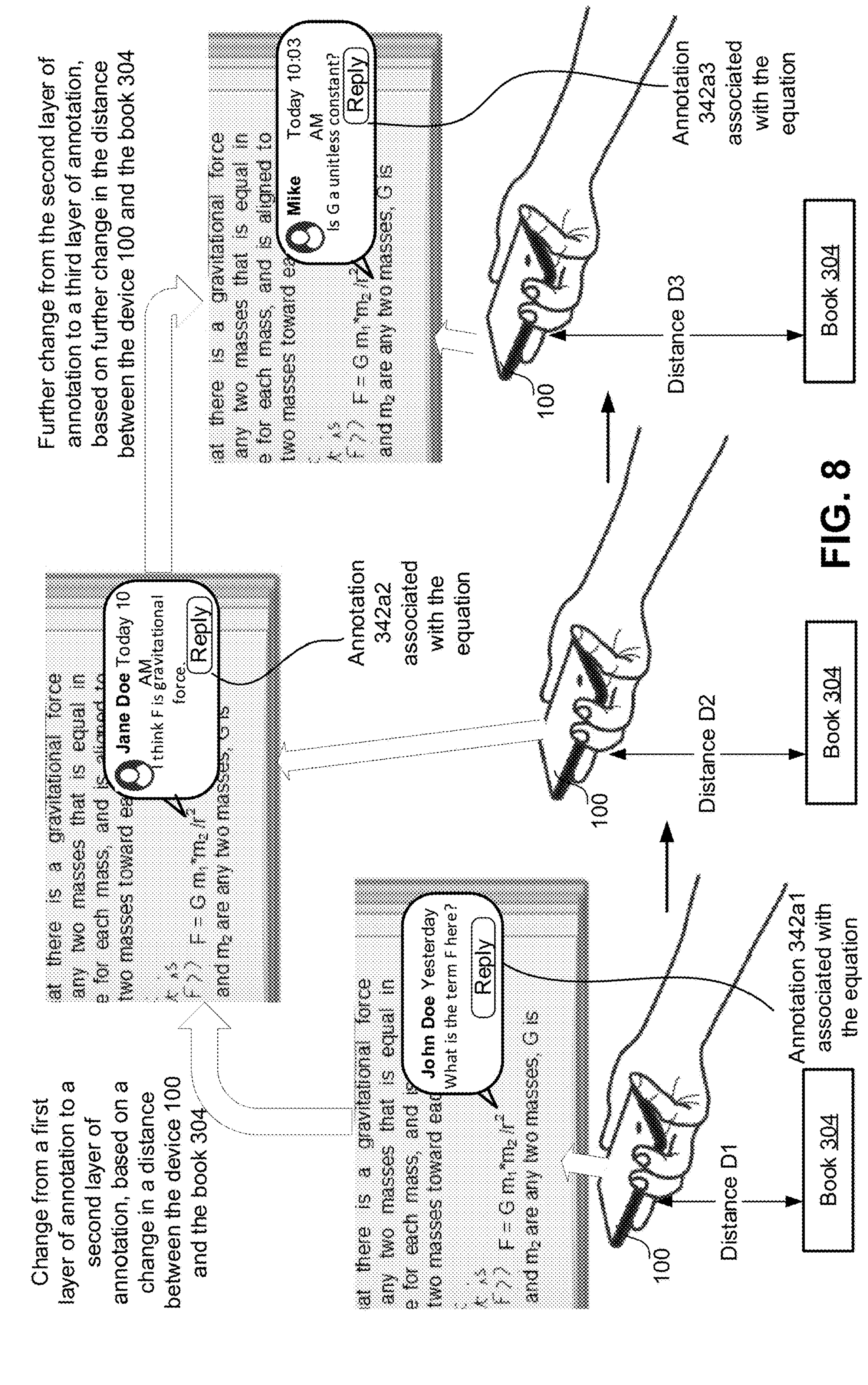
FIG. 8 illustrates an example use case where a superimposition of digital user markings on images of a printed version changes based on a change in a relative orientation or position of a computing device with respect to the printed version, in accordance with some embodiments of the present disclosure.

In FIG. 6, a digital user marking 342 is specifically labelled as digital user marking 342*a*, where the digital user marking 342*a* is a collection of annotations. In some embodiments, the annotations are displayed similar to that in FIG. 6, where at least some of the multiple annotations are displayed simultaneously, and the user can scroll through the multiple annotations using the illustrated "up" or "down" arrows. However, where multiple annotations are involved, the annotations can be selectively displayed one (or more than one) at a time, based on a relative orientation of the device 100 with respect to the book 304. FIG. 8 illustrates an example use case where the superimposition of digital user markings changes, based on a change in a relative orientation or position of the device 100 with respect to the book 304, in accordance with some embodiments of the present disclosure. For example, FIG. 8 illustrates three scenarios: (i) a first scenario where the device 100 (e.g., the imaging component 142) is at a distance D1 from the book 304, (ii) a second scenario where the device 100 (e.g., the imaging component 142) is at a distance D2 from the book 304, and (iii) a third scenario where the device 100 (e.g., the imaging component 142) is at a distance D3 from the book 304. In the example of FIG. 8, D2 is greater than D1, and D3 is greater than D2. Thus, in FIG. 8, the user progressively moves the device 100 away from the book. Also illustrated, for each of the three scenarios, corresponding portion of the superimposed image displayed on the display screen 142 of the device 100.

In some embodiments, the multiple annotations of the digital user marking 342*a* associated with the equation (discussed with respect to FIG. 6) are stacked in different layers. In an example, a first layer of annotation 342*a*1 (e.g., where John comments "What is the term F here?") is displayed when the device 100 is at the distance D1 from the book. A second layer of annotation 342*a*2 (e.g., where Jane comments "I think F is gravitational force") is displayed when the device 100 is at the distance D2 from the book. Finally, a third layer of annotation 342*a*3 (e.g., where Mike comments "Is G a unitless constant?") is displayed when the device 100 is at the distance D3 from the book. Thus, by moving the device 100 relative to the book 304, the user is able to view multiple annotations, one at a time.

Thus, illustrated in FIG. 8 is a 3D viewing technique to allow a continuous and natural annotation viewing experience. The AR localization is used to support a magnifying glass like viewing experiences for multiple annotations. Traditional annotation layout designs are typically flattened and placed next to the desired section of text. A user can scroll or pan to view those annotations. However, unlike digital interaction space where scrolling or panning are limitless, the AR environment using the device 100 is limited by its physical surroundings. Therefore, layout annotations in a purely flat format are unable to display large numbers of annotations within a constrained space. By incorporation the concept of multiple layers of annotations, as discussed with respect to FIG. 8, a user can view larger number of annotations within the same spatial constrains.

Referring again to FIG. 7B, the method 700 proceeds from 724 to 728. At 728, the device 100 (e.g., the user marking module 112) receives input from the user indicating new digital user markings. Thus, while the image stream of the printed version is being displayed on the display screen, the user 404*a* can input one or more new digital user markings. There are different manners in which a user can input new digital user markings in the AR environment of the device 100, some of which are discussed herein with respect to FIGS. 9-13B below.

It may be noted that the operations 724 and 728 need not be performed in any particular order. For example, the user 404*a* can input a first new digital user marking in accordance with 728, the device 100 can superimpose the new and/or one or more old digital user markings in accordance with 724, and the user 404*a* can input a second new digital user marking in accordance with 728, and these operations can be performed in any order.

Figure 9:
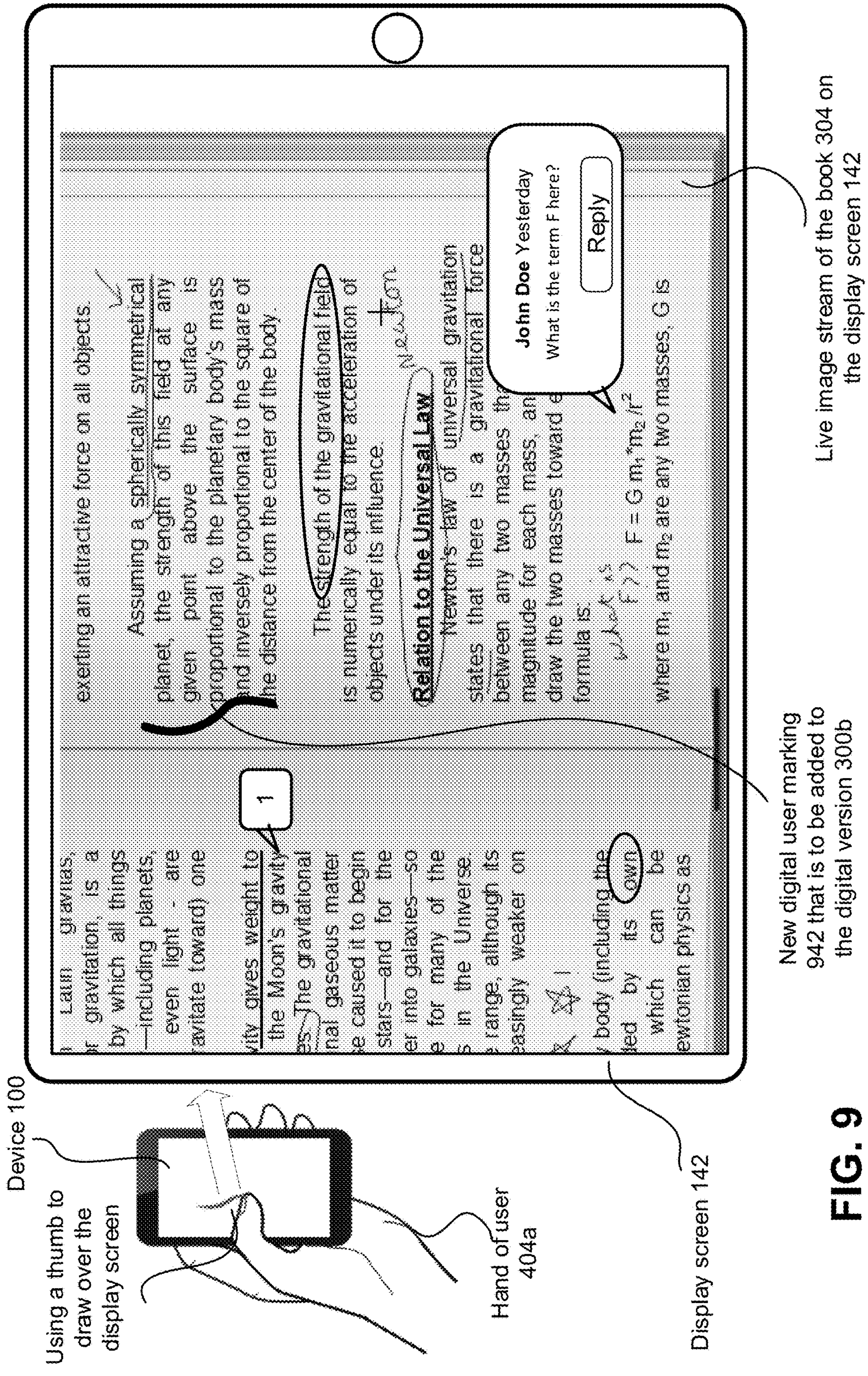
FIG. 9 illustrates another example use case where a new digital user marking is input using a touch screen display of a computing device, while an image stream of a printed version is being displayed on the touch screen display of the device, in accordance with some embodiments of the present disclosure.

FIG. 9 illustrates an example use case where a new digital user marking 942 is input using the touch screen display 142 of the device 100, while image stream of the printed version 300*a* is being displayed on the touch screen display 142 of the device 100, in accordance with some embodiments of the present disclosure. Thus, FIG. 9 illustrates an example implementation of the operations of block 728 of FIG. 7B. For example, the user 404*a* draws, writes, doodles, scribbles, or otherwise provides the new digital user marking 942 on the display screen 142 using his or her finger. The right side of FIG. 9 illustrates the image of the printed version 300*a* being displayed on the display screen 142. As illustrated, the new digital user marking 942 is superimposed on the image stream of the printed version 300*a*. Thus, in FIG. 9, a user's finger scribbles or otherwise provides user input on the touch screen 142 directly, similar to how touch-based inputs (e.g., drag gestures, tap-and-hold gestures, etc) are received in any number of touch screen applications, such as 2D drawing applications. In some embodiments, ray-cast techniques are used to determine the corresponding 3D coordinates from those points drawn by the user. The 3D coordinates are then connected to become 3D scribbling or other input. Any number of suitable techniques and touch screen technologies can be used to receive in the touch-based input, as will be appreciated.

For example, as illustrated in FIG. 9, the new digital user marking 942 is drawn next to a section of the image of the printed version 300*a*, where the section starts with "Assuming a spherically symmetrical . . . " In the digital version 300*b*, the new digital user marking 942 is also associated with the same section that starts with "Assuming a spherically symmetrical . . . " Thus, any input of a new digital user marking on or near a section of the image of the printed version 300*a* results in association of the new digital user marking to the corresponding section of the corresponding digital version 300*b* of the document.

Figure 10A:
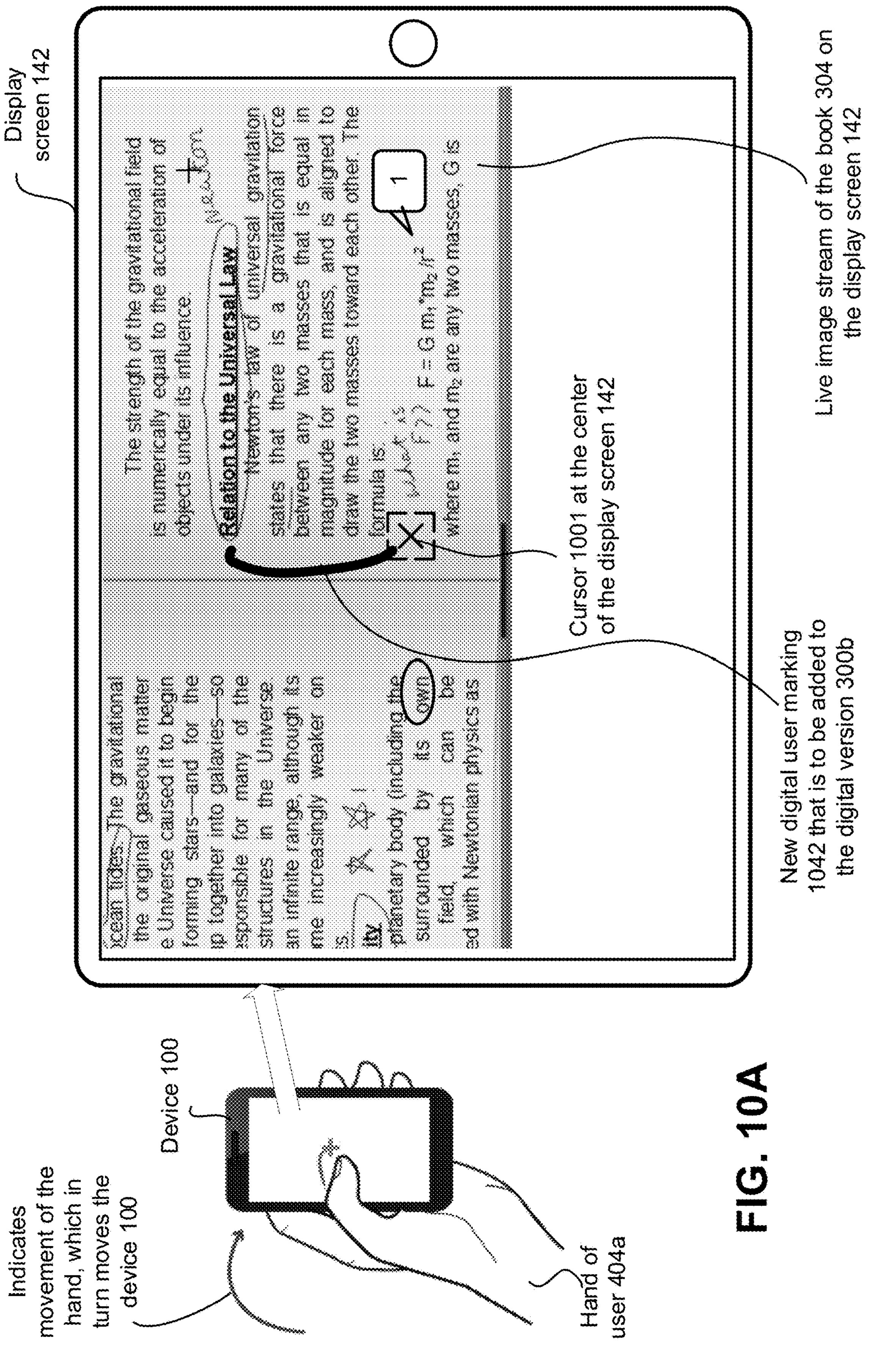
FIGS. 10A-10B collectively illustrate another example use case where a new digital user marking is formed, based on a movement of a computing device, while an image stream of a printed version is being displayed on a display screen of the computing device, in accordance with some embodiments of the present disclosure.
Figure 10B:
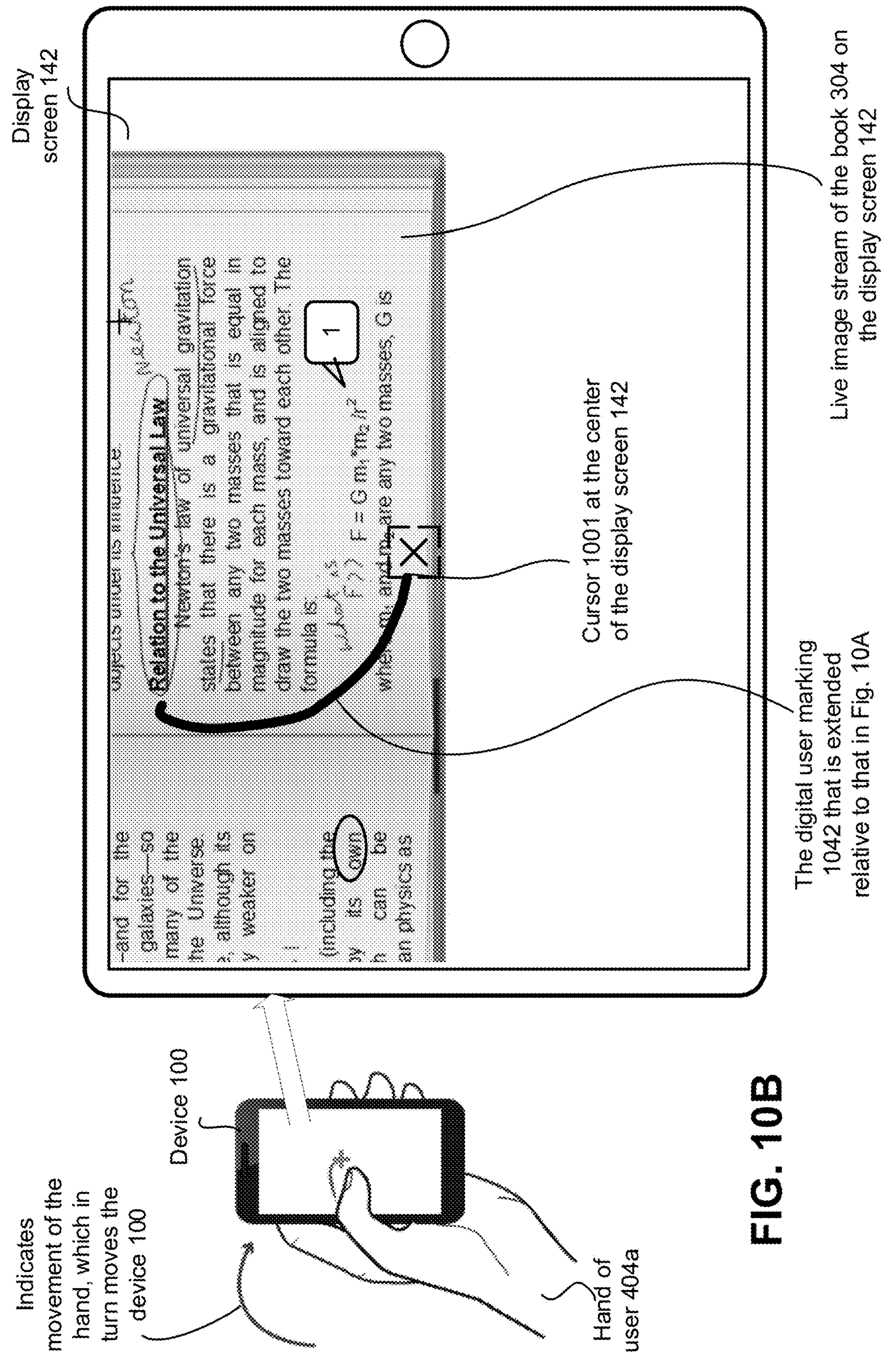

In FIG. 9, the user scribbles using a finger to input a new digital user marking via the touch screen. However, in some other embodiments, the device 100 itself can be moved, wherein the movement of the device (rather than a user's finger) causes input of a new digital user marking in the AR environment of the device 100. One such example case is shown in FIGS. 10A-10B, which collectively illustrate formation of a new digital user marking 1042 on the digital version 300*b*, based on a movement of the device 100, while image stream of the printed version 300*a* is being displayed on the display screen 142 of the device 100, in accordance with some embodiments of the present disclosure. Thus, FIGS. 10A-10B illustrates another example implementation of the operations of block 728 of FIG. 7B.

Referring to FIG. 10A, in some embodiments, a virtual cursor 1001 is displayed on the display screen 142. In some embodiments, the cursor 1001 is displayed at a fixed position of the physical display screen 142. Merely as an example, the cursor 1001 is displayed on a center location of the display screen 142. In another example, the cursor 1001 is displayed on a different location of the display screen 142, and the location of the cursor 1001 relative to the physical display screen 142 does not change even when the user 404*a* moves the device 100 relative to the book 304. The shape and size of the cursor 1001 illustrated in the figures are merely examples, and are not intended to limit the scope of this disclosure.

In FIG. 10A, the user 404*a* moves the device 100 relative to the book 404. For example, the user selects an option to input new digital user markings via device movement. Subsequently, the user initiates a tap-and-hold gesture on the display screen 142, which initiates the input of the new digital user marking 1042. The tap-and-hold gesture is activated by tapping on the display screen 142 with a finger or stylus or other such implement, and continuing to hold that tap in place on the display screen 142. The input gesture remains active while the tap is held in position on the display screen 142, and terminates when the user 404*a* releases the tap from the display screen 142.

Once the user initiates the tap-and-hold gesture on the display screen 142, the cursor 1001 is displayed on the display screen. While the gesture is active, the user 404*a* moves the device 100 relative to the book 304. In some such embodiments, the device 100 has motion sensors that can detect the movement of the device 100. Furthermore, as the user moves the device 100, the displayed positions of various sections of the printed version 300*a* change within the display screen 142. The cursor 1001 acts as a virtual marker or virtual pen, and markings are formed along a path of the image of the printed version 300*a* passing under the cursor 1001, as illustrated in FIG. 10A.

Thus, a path of the new digital user marking 1042 is based on how the device 100 is being moved relative to the underlying printed version 300*a* that is being videoed (or otherwise imaged). Put differently, as and when the device 100 is being moved, the image of the printed version 300*a* also moves relative to the display screen 142. On the other hand, the cursor 1001 is at a fixed position (e.g., at a center) relative to the display screen 142. This generates a relative movement between the image of the printed version 300*a* and the cursor 1001. The path of the new digital user marking 1042 is based on the relative movement between the image of the printed version 300*a* and the cursor 1001. To this end, the path of the marking 1042 tracks the path of the cursor movement over the printed version.

In FIG. 10B, the new digital user marking 1042 is further extended relative to its shape in FIG. 10A. This is done by further moving the image of the printed version 300*a* relative to the display screen, while the cursor 1001 is at the same fixed position (e.g., at the center) relative to the display screen 142. Thus, the cursor 1001 is used to provide scribbles or other marks in the AR environment using movement of the device 100. The new digital user marking 1042 ends when the user 404*a* releases the tap-and-hold input gesture from the display screen 142. That is, the end of the tap-and-hold gesture ends the input of the new digital user marking 1042.

Note that the location of the tap-and-hold gesture is not germane to the path of the new digital user marking 1042—rather, the path of the marking 1042 is based on how the images of the printed version 300*a* move relative to the cursor 1001. To this end, the tap-and-hold gesture can be anywhere on the touch screen. Further note that the tap-and-hold gesture to initiate a new marking 1042 may include a unique number of touch points (such as one, two or three touch points provided by one, two or three fingers, respectively), so that particular tap-and-hold gesture can be distinguished from other touch points that are intended to invoke other functions.

In some embodiments, any input of a new digital user marking on or near a section of the image of the printed version 300*a* via the cursor 1001 results in association of the new digital user marking to the corresponding section of the corresponding digital version 300*b* of the document. For example, as illustrated in FIG. 10B, the new digital user marking 1042 is drawn next to a section of the image of the printed version 300*a*, where the section is headlined "Relation to the Universal Law . . .". In the digital version 300*b*, the new digital user marking 1042 is also associated with the same section that has the same headline.

FIGS. 11A, 11B, 11C, 11D, 11E illustrate an example use case where new digital user markings are formed on the digital version 300*b* based on automatic selection using a cursor 1001, while image stream of the printed version 300*a* is being displayed on the display screen 142 of the device 100, in accordance with some embodiments of the present disclosure. Thus, FIGS. 11A-11E illustrates another example implementation of the operations of block 728 of FIG. 7B.

Figure 11A:
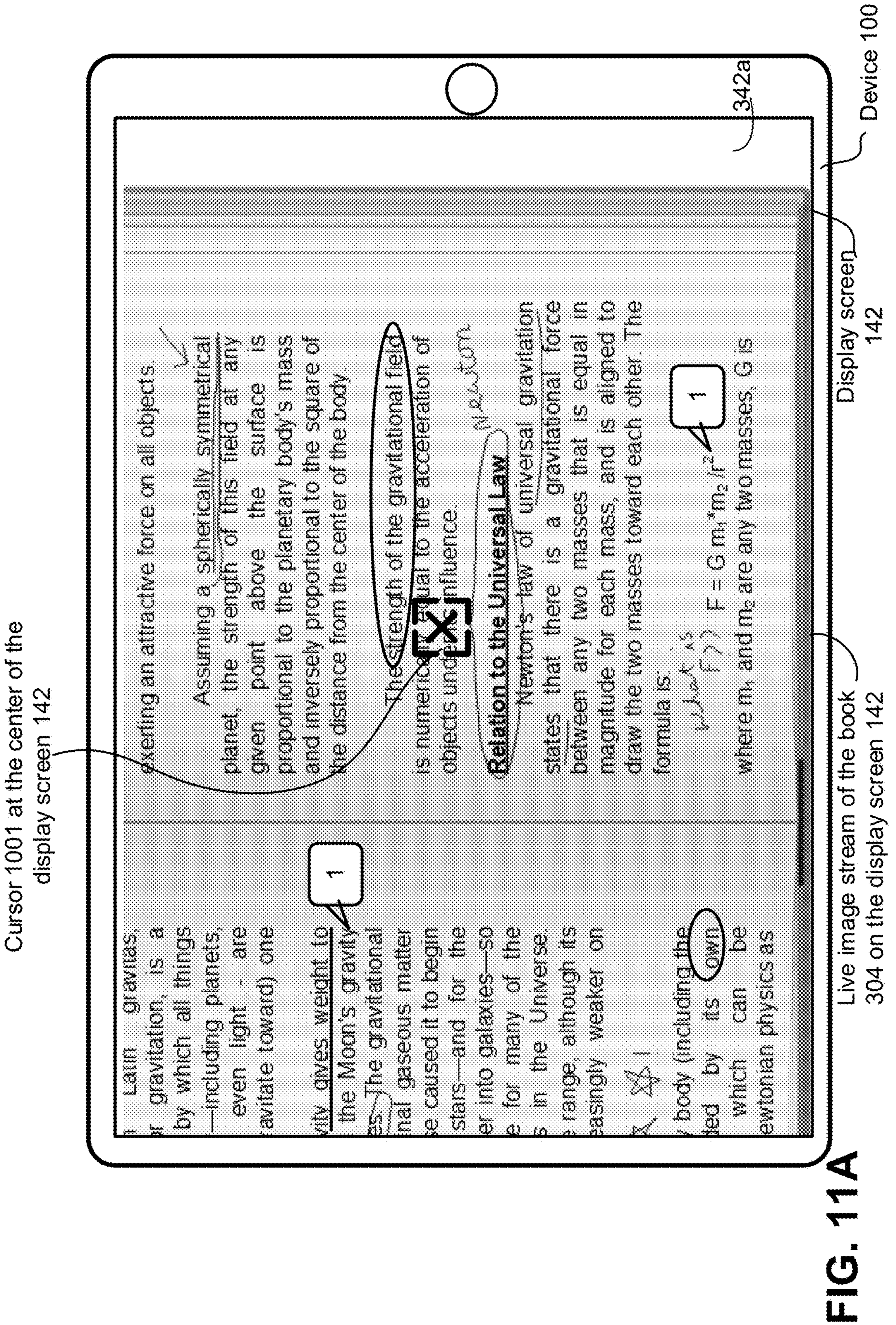
FIGS. 11A, 11B, 11C, 11D, 11E illustrate another example use case where new digital user markings are formed on a digital version, based on automatic selection using a hovering cursor, while an image stream of a printed version is being displayed on a display screen of a computing device, in accordance with some embodiments of the present disclosure.

In FIG. 11A, the cursor 1001 is displayed on the display screen 142, as discussed with respect to FIGS. 10A, 10B. This cursor 1001 is used for selection of one or more sections of the document. Once the section is selected, a new digital user marking can be added to the selected section of the document. The new digital user marking can be of any appropriate type, such as highlight of the selected section, an annotation added to the selected section, and/or underline added to the selected section.

For example, in FIG. 11A, the cursor 1001 is displayed on a specific section of the image of the printed version 300a, where the section (also referred to herein as a segment) includes the following text: "The strength of the gravitational field is numerically equal to the acceleration of objects under its influence."

As previously discussed herein, the document structure identification modules 110 and/or 210 identify the document structure of the digital version 300*b* of the document, and hence, is also aware of the structure of the printed version 300*a* of the document. Merely as an example, the document structure identification module 110 employs the document structure extraction algorithm to identify the structure of the document. For example, document structure identification module 110 identifies elements such as lines, paragraphs, figures, and tables from the digital version 300*b*, and maps the structure known from the digital version 300*b* to the images of the printed version 300*a*.

Thus, the device 100 is aware that the section over which the cursor 1001 is currently superimposed is a three-line paragraph, and is aware as to where the paragraph starts and ends. That is, the device 100 already has paragraph segmentation knowledge, based on receiving the document structure information. In some embodiments, an appropriate user input (such as a single tap, or another input that indicates a selection) causes the entire section or segment (such as the entire paragraph), on which the cursor 1001 is currently located, to be selected. Thus, the document structure is used for guiding user interactions in the device AR environment.

Figure 11B:
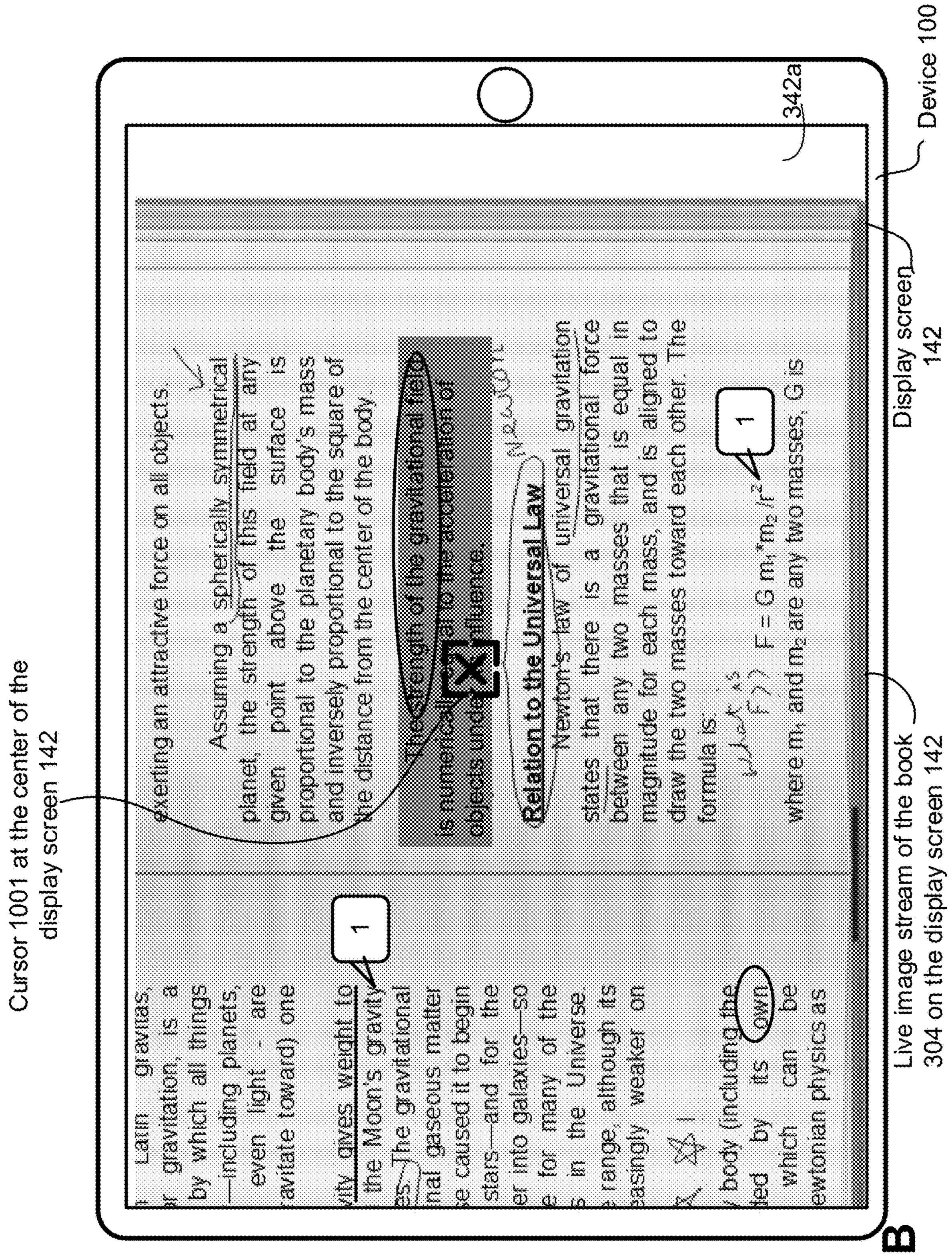

FIG. 11B illustrates the selected paragraph (e.g., selection of which is discussed with respect to FIG. 11A) being highlighted. For example, once the paragraph is selected, the user can select a highlight option to highlight the selected paragraph.

Figure 11C:
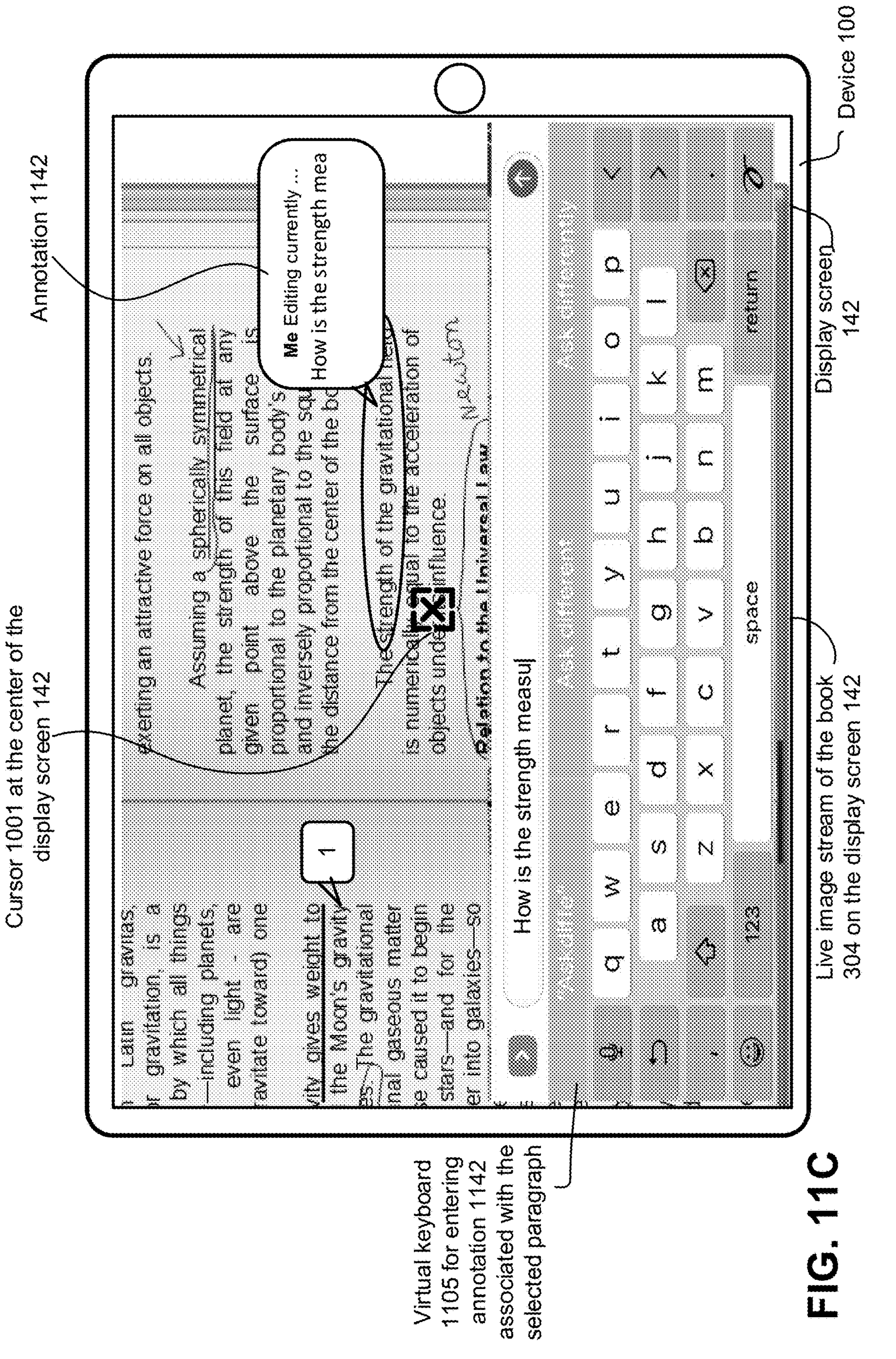

FIG. 11C illustrates an annotation that is being added to the selected paragraph (e.g., selection of which is discussed with respect to FIG. 11A). For example, once the paragraph is selected and entry of a new annotation is requested by a user, a virtual keyboard 1105 is displayed, using which the user can enter an annotation 1142 associated with the selected paragraph.

Thus, in FIG. 11B, the paragraph "The strength of the gravitational field is numerically equal to the acceleration of objects under its influence." is highlighted. In FIG. 11C, the annotation 1142 is added to the same paragraph. Although the highlight and annotation are performed with respect to the images of the printed version 300*a*, the highlight and annotation are also added to the same corresponding paragraph of the corresponding digital version 300*b* as well, as discussed with respect to block 728 of FIG. 7B.

Figure 11D:
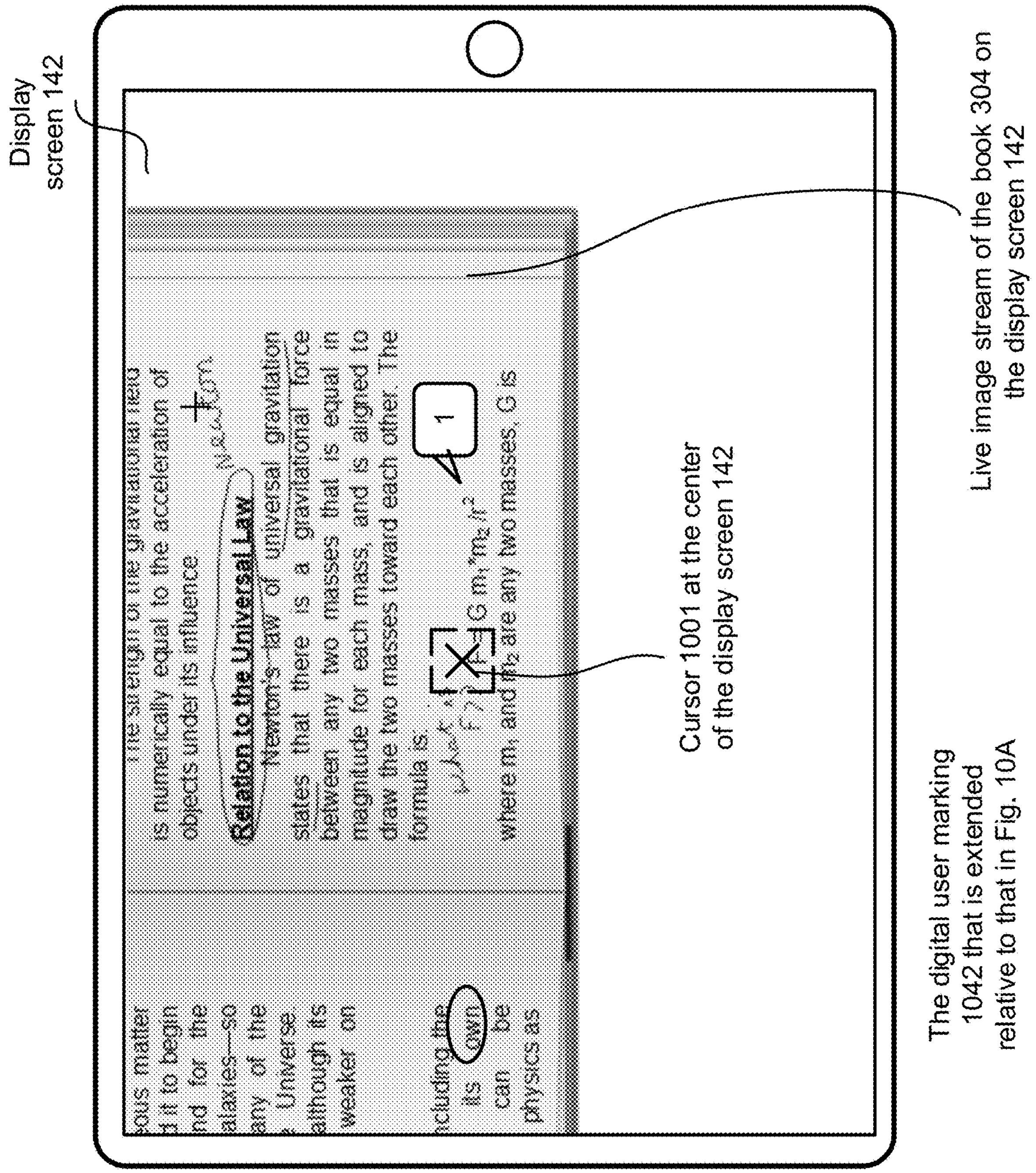

In FIG. 11D, the cursor 1001 is superimposed on the equation "$F=G\ m_1 \times m_2/r_2$" of the image of the printed version 300*a* of the book 304. Accordingly, an appropriate user input (such as a single tap, or another input that indicates a selection) causes the equation to be selected.

Figure 11E:
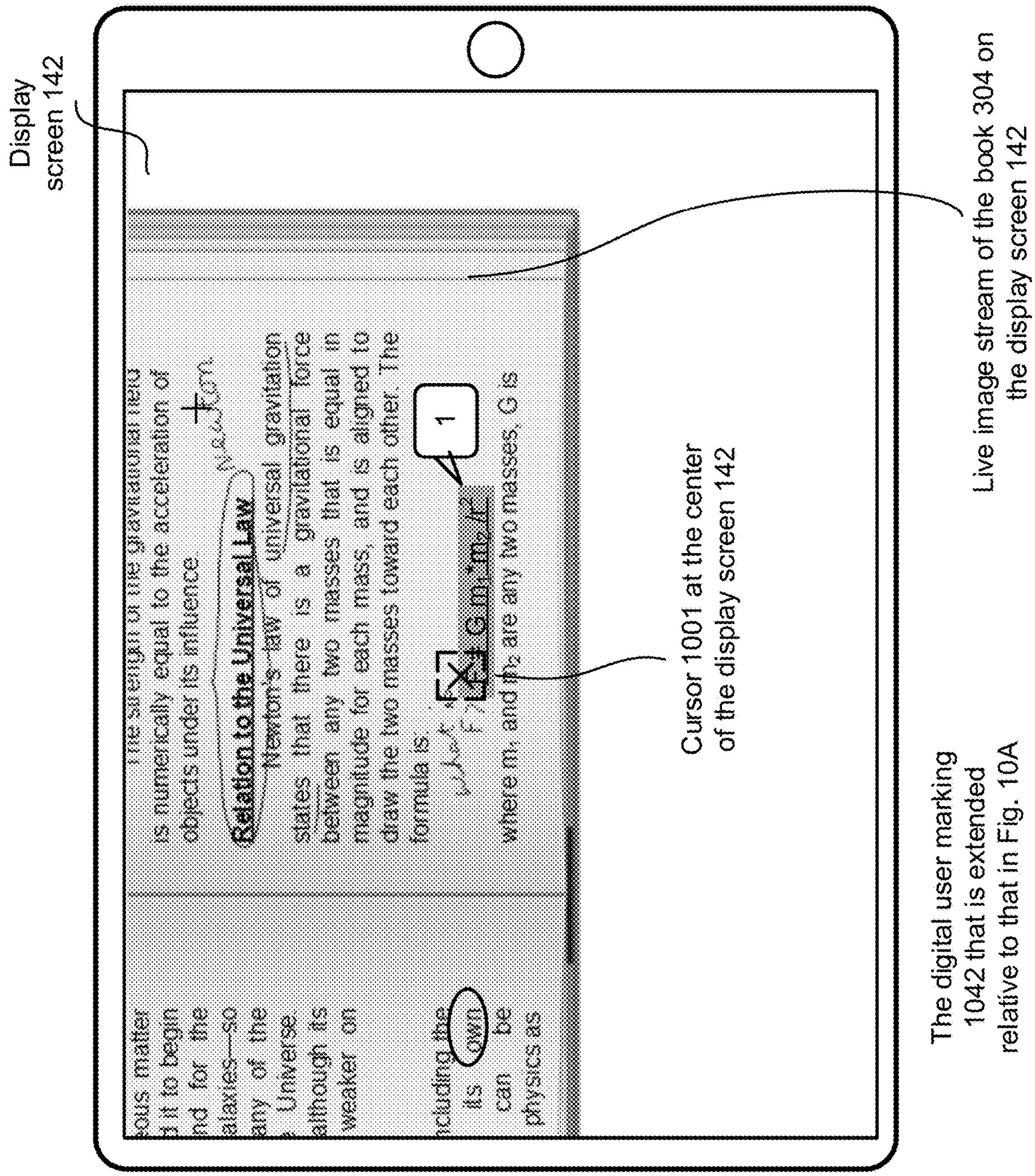

FIG. 11E illustrates the selected equation (e.g., selection of which is discussed with respect to FIG. 11D) being highlighted and underlined. For example, once the equation is selected, the user can select a highlight option and/or an underline option to highlight and/or underline the selected equation.

In FIGS. 11A, 11B, 11C, 11D, 11E, an entire section of the document, such as an entire paragraph, an entire equation, an entire figure, or an entire table, can be selected for adding a new digital user marking, such as highlight, underline, or annotation. The mode selection in these figures can be termed as an "automatic" selection mode. This mode of inputting new digital markings is also referred to herein as an automatic mode of creating new digital markings in the sense that an entire section of the image is selected for digital marking, based on the cursor hovering anywhere over the section. Thus, when the device 100 is operating in the automatic selection mode, as discussed with respect to FIGS. 11A-11E, the cursor 1001 can be used to select an entire section of the document, such as an entire paragraph, an entire equation, an entire figure, or an entire table. In the automatic selection mode, the cursor 1001 may not be used to select a specific word, a specific sentence, or a specific phrase (i.e., a part of a section, and not a full section) for highlighting, and hence, the automatic selection mode discussed with respect to FIGS. 11A-11E provides a respectively lower level of selection granularity.

Figure 12:
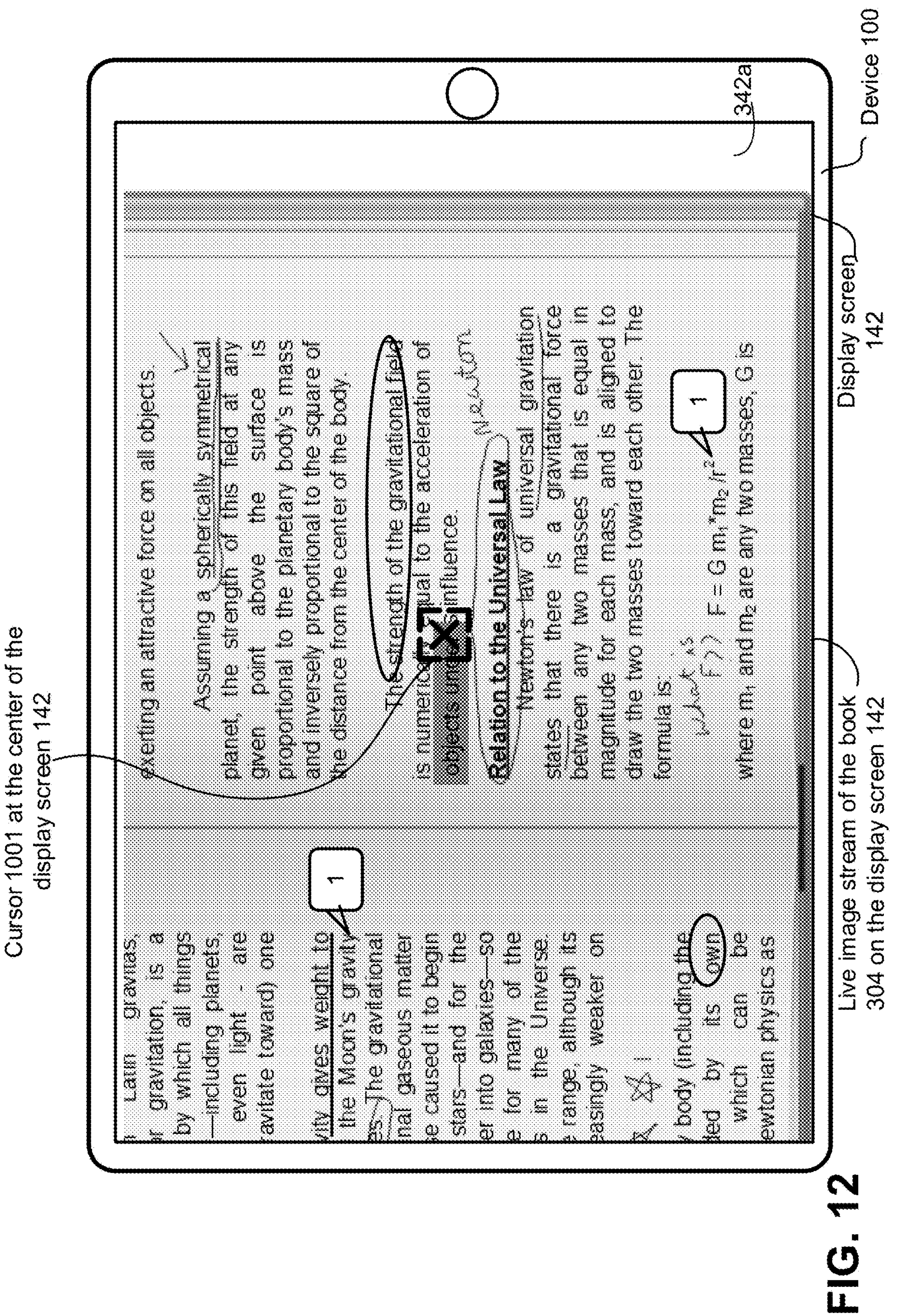
FIG. 12 illustrates a semi-automatic selection mode in which imaged sections of a physical document can be selected using a cursor, in accordance with some embodiments of the present disclosure.

FIG. 12 illustrates a semi-automatic selection mode in which sections of the document can be selected using the cursor 1001, in accordance with some embodiments of the present disclosure. In contrast to the automatic mode where an entire section is selected based on the hovering of the cursor, in a semi-automatic selection mode, merely a portion of a section of the printed version can be selected using the cursor based on a movement of the cursor. For example, the semi-automatic selection mode provides a finer level of selection granularity compared to the automatic selection mode discussed with respect to FIGS. 11A through 11E. In the semi-automatic selection mode, the cursor 1001 can be used to select individual words, sentences, phrases, or any portion of a section of the document.

For example, once the semi-automatic selection mode is activated, the device 100 is moved with respect to the book 304. As and when the device 100 is being moved, the image of the printed version 300*a* also moves relative to the display screen 142. On the other hand, the cursor 1001 is at a fixed position (e.g., at a center) relative to the display screen 142. This generates a relative movement between the image of the printed version 300*a* and the cursor 1001. The words or phrases (or sections of the document) covered by the cursor 1001 are selected, until the semi-automatic selection mode is deactivated. For example, in FIG. 12, the phrase "objects under" is selected and highlighted using the cursor 1001.

In some embodiments and although not illustrated, the semi-automatic selection mode can be enhanced, based on knowledge of the structure of the document. For example, if a section of a phrase is selected and highlighted, the highlight can be extended or rounded up to the closest phrase, or closest sentence, or paragraph. For example, the words "object under" is initially selected by the movement of the cursor, as illustrated in FIG. 12. In an example, this selection can be extended to cover an entire phrase "objects under influence," and the entire phrase can be highlighted. In another example, this selection can be extended to cover an entire sentence, or even an entire paragraph.

Figure 13A:
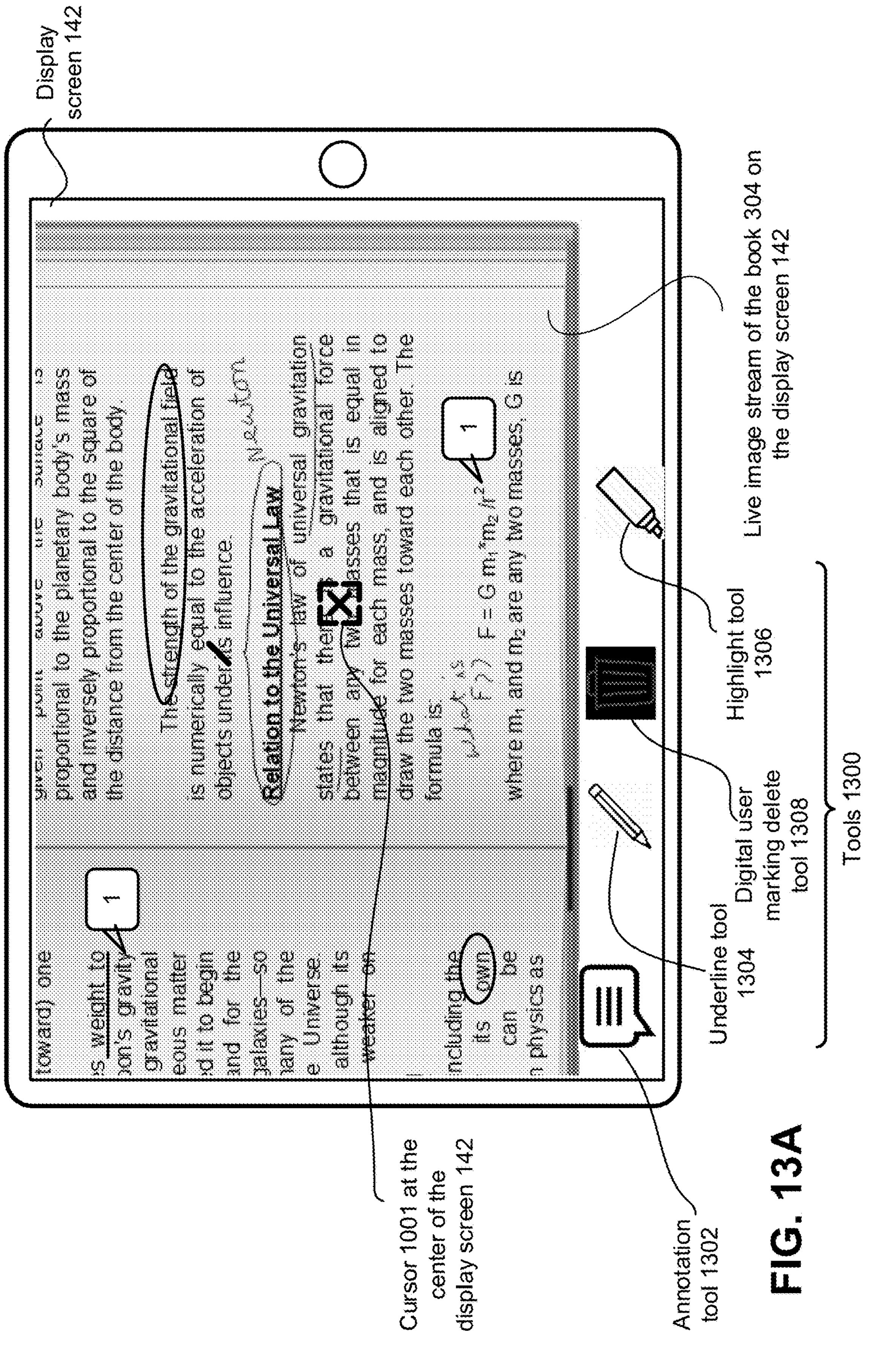
FIGS. 13A, 13B illustrate selection of a user marking tool using a hovering cursor, wherein the position of the cursor is fixed relative to a display screen of a computing device, in accordance with some embodiments of the present disclosure.
Figure 13B:
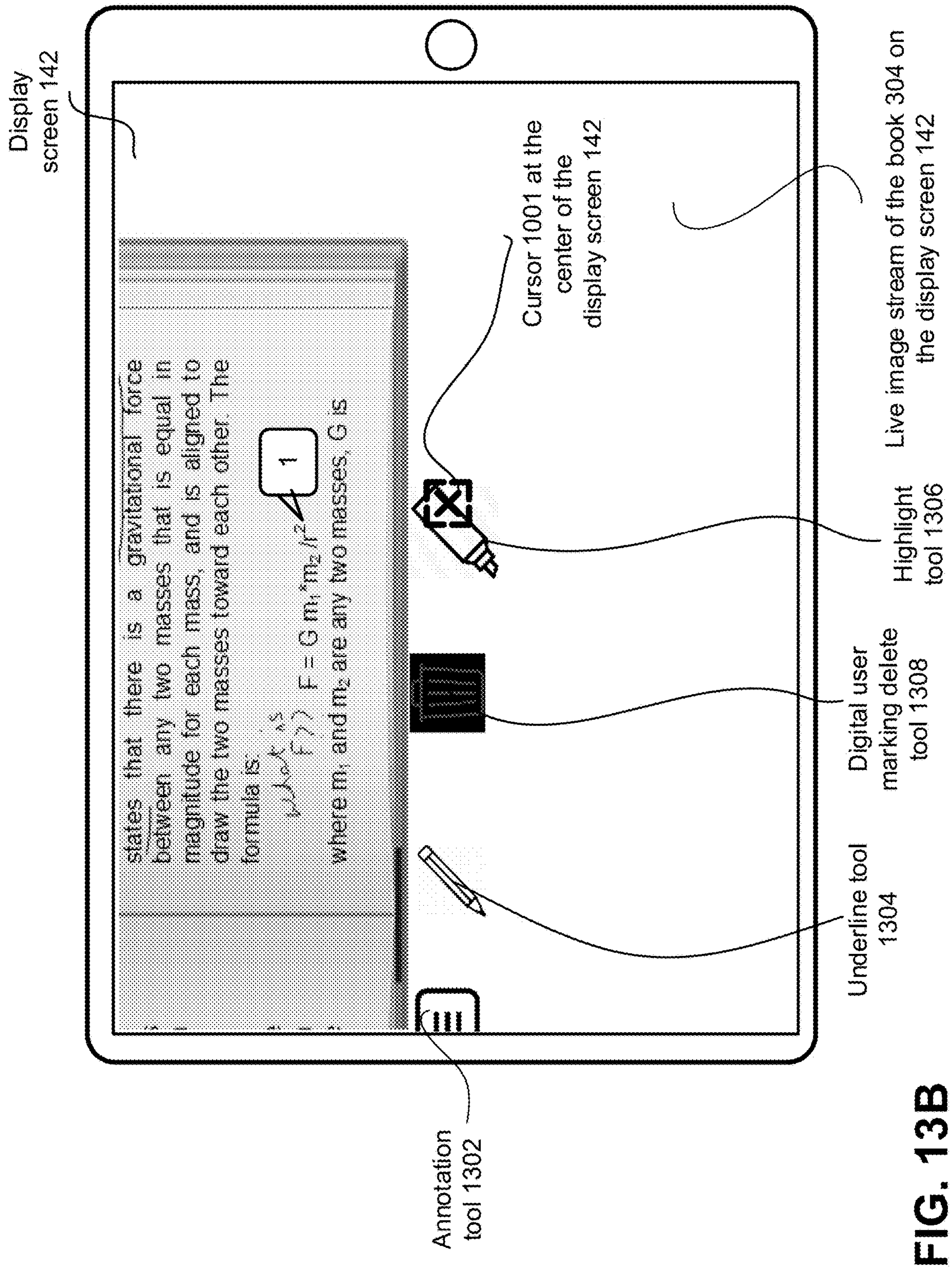

FIGS. 13A, 13B illustrate selection of a user marking tool using a hovering of the cursor 1001, a position of which is fixed relative to the display screen 142, in accordance with some embodiments of the present disclosure. In some embodiments, one or more tools 1300 or menu items are displayed on the display screen, where the tools 1300 can be used to form digital user markings (or can be used for another purpose). Examples of such tools 1300 include an annotation tool 1302 to generate a new annotation or comment, an underline tool 1304 that can be used to underline text, a highlight tool that can be used to highlight content, and a digital user marking delete tool 1308 to selectively delete digital user markings, as illustrated in FIG. 13A, although any other types of tools and/or menu items can be used, as will be appreciated.

In some embodiments, the tools 1300 are anchored at a fixed position relative to the images of the printed version 300*a* included in the book 304. Merely as an example, the tools 1300 are anchored at a bottom of the images of the printed version 300*a*. Thus, in both FIGS. 13A, 13B, the tools 1300 are anchored near a bottom of the images of the printed version 300*a*. That is, in FIGS. 13A, 13B, as the position of the images of the printed version 300*a* changes, there is a corresponding change in the position of the tools 1300. For example, in FIG. 13B, the book 304 in the image is moved to the left, and hence, the left portion of the book 304 as well as left portion of the annotation tool 1302 is not visible in FIG. 13B.

To select a tool, such as the highlight tool 1306, the images are moved by the user 404*a* (e.g., by moving the device 100 relative to the book 304), such that the cursor 1001 is over top of the highlight tool 1306. This is possible because, as discussed herein above, the position of the cursor 1001 does not change relative to the display screen 142, even when the position of the images of the printed version 300*a* change relative to the display screen. For example, in FIG. 13B, the cursor 1001 is over the highlight tool 1306. Once the cursor 1001 is over the highlight tool

1306, the user 404*a* can provide an input that causes a selection of the highlight tool 1306.

For example, a single tap on the display screen, while the cursor 1001 is over the highlight tool 1306, can cause a selection of the highlight tool 1306. In another example, if the cursor 1001 is over the highlight tool 1306 for at least a threshold period of time (i.e., if the cursor 1001 hovers over the highlight tool 1306 for sufficiently long time), that can cause a selection of the highlight tool 1306. Once the highlight tool 1306 is selected, the user 404*a* can highlight content as desired, as discussed with respect to the automatic and semi-automatic modes for highlighting discussed herein previously.

Referring again to the method 700 of FIG. 7B, the method 700 then proceeds from 728 to 732, where the digital version 300*b* is updated, to store the new digital user markings that are received at 728. For example, if a local storage (such as document database 146*a*) is used for the storing the digital version 300*b* of the document, the digital version 300*b* of the document is updated in the local storage. If a remote storage (such as document database 146*b*) is used for the storing the digital version 300*b* of the document, the digital version 300*b* of the document is updated or synchronized in the remote storage. Thus, the local addition and/or changes to the digital user markings are synchronized to the digital version 300*b* of the document stored in the cloud-based or remote document database 146*b*.

As previously discussed herein, in some embodiments, an online server, such as the server 201, is used to synchronize user-created digital user markings 342. Because the remotely stored digital version 300*b* can be shared by multiple users, in some embodiments, an online cloud-based database can be used to store all the user-created digital user markings 342, as discussed with respect to FIG. 4B. In an example, the digital user markings 342 are saved with the digital version 300*b*. In another example, the digital user markings 342 are saved separately from the digital version 300*b*. Both options are illustrated in FIG. 4B. When a user uses the device 100 to view an image stream of the physical document, digital user markings 342 (if any) are loaded from the database to the device 100, and are superimposed on the image stream of the physical version 300*a*. If and when the user makes a new digital user marking in the AR environment (as discussed with respect to block 728 of method 700), the new digital user marking is saved to the online database. Because the device 100 may not always be connected to the network 105 (such as the Internet), a client script can be used in the device 100, where the client script helps synchronize digital user marking generated in the device 100 with the remote digital user marking database.

Referring again to the method 700 of FIG. 7B, the method 700 then proceeds from 732 to 736. The operations at 736 are optional, and can be skipped in some embodiments.

At 736, the device 100 identifies one or more physical user markings 312 within the image stream of the printed version 300*a*, and converts the physical user markings to corresponding digital user markings. For example, the device 100 employs an Optical Character Reader (OCR) to read and understand hand-written comments and other markings within the image stream of the printed version 300*a*. For example, referring to FIG. 6, the user has a hand-written comment "What is F??" near the equation at the bottom of the page. The device 100 reads this hand-written comment. The device 100 (such as the user marking module 112) adds a corresponding digital user marking, such as an annotation that reads "What is F??", and associates the new digital annotation to the equation in the digital version 300*b*.

In another example and still referring to FIG. 6, the user has a hand-drawn circle around the phrase "Relation to the Universal Law." The device 100 converts this hand-drawn circle to a digital user marking that digitally encircles the same phrase in the corresponding digital version 300*b*.

Referring again to FIG. 7B, at 736, the device 100 also updates the digital version 300*b* of the digital document to store the converted digital user markings, as discussed with respect to operations at block 732.

Numerous variations and configurations will be apparent in light of this disclosure and the following examples.

Example 1. A method for sharing user markings between a digital version and a printed version of a document, the method comprising: capturing, by an imaging device, an image of the printed version of the document, the image of the printed version includes an image of a section of the printed version; accessing the digital version of the document; mapping between the image of the printed version and the digital version, to identify a section in the digital version of the document that corresponds to the section of the printed version; identifying a digital user marking in the section in the digital version of the document; superimposing, in the image of the printed version of the document, the digital user marking on or near the corresponding section in the printed version of the document; and causing display of the image of the printed version of the document, with the digital user marking superimposed.

Example 2. The method of example 1, wherein the digital user marking is a first digital user marking, and the method further comprises: while the image of the printed version is being displayed on a display, generating a second digital user marking, wherein the second digital user marking is marked relative to the image of the printed version of the document; and updating the digital version of the document to incorporate the second digital user marking in the digital version of the document.

Example 3. The method of example 2, wherein generating the second digital user marking comprises: causing display of, on the display, a stream of images of the printed version of the document, with the first digital user marking superimposed to the stream of images; causing display of, on the display, a cursor, wherein a position of the cursor is fixed relative to the touch screen display; and in response to the cursor hovering over a segment of the printed version within the stream of images, causing selection of an entirety of the segment of the printed version within the stream of images; and generating the second digital user marking for the selected segment of the printed version.

Example 4. The method of example 3, wherein causing selection of the entirety of the segment of the printed version within the stream of images comprises: determining a structure of the digital version of the document using metadata included in the digital version; based on the structure of the digital version of the document, determining a structure of the printed version of the document; identifying, using the structure of the printed version of the document, the entirety of the segment of the printed version within the stream of images, in response to the cursor hovering over the segment of the printed version within the stream of images; and causing selection of the identified entirety of the segment of the printed version within the stream of images.

Example 5. The method of example 2, wherein generating the second digital user marking comprises: causing to display a stream of images of the printed version of the document, with the first digital user marking superimposed; and causing to display a cursor on the touch screen display, wherein the cursor is displayed at a fixed position within the touch screen display even when a user touch is detected at a different position within the touch screen display and/or even when the stream of images of the printed version of the document moves relative to the touch screen display.

Example 6. The method of example 5, wherein generating the second digital user marking further comprises: in response to a movement of the imaging device relative to the printed version, causing to move the stream of images of the printed version relative to the touch screen display, such that the stream of images of the printed version also moves relative to the cursor; in response to the cursor moving over one or more words of the printed version within the stream of images, selecting the one or more words of the printed version; and generating the second digital user marking for the selected one or more words of the printed version within the stream of images Example 7. The method of any of examples 5-6, wherein the selected section within the stream of images initially includes the one or more words, the method further comprising: extending the selection to incorporate an additional one or more words within the stream of images, wherein the additional one or more words are adjacent to the initially selected one or more words, or are included within a same sentence as the initially selected one or more words.

Example 8. The method of example 2, wherein generating the second digital user marking comprises: causing display of, on the display, a stream of images of the printed version of the document, with the first digital user marking superimposed; causing display of, on the display, a cursor, wherein a position of the cursor is fixed relative to the touch screen display; and in response to a movement of the imaging device relative to the printed version and/or engagement of a zooming function, marking a path over the printed version in the stream of images that corresponds to and tracks a path the cursor takes over the printed version in the stream of images during said movement or zooming, to generate the second digital user marking.

Example 9. The method of any of examples 1-8, further comprising: causing display of, on a display screen, a stream of images of the printed version of the document, with the first digital user marking superimposed; causing display of, on the display screen, a user interface including a plurality of tools, the plurality of tools including a first tool to generate a first type of digital user marking and a second tool to generate a second type of digital user marking, wherein the plurality of tools is anchored to the printed version within the stream of images; causing display of, on the display screen, a cursor, wherein a position of the cursor is fixed relative to the display screen; and in response to the cursor hovering over the first tool for at least a threshold period of time, selecting the first tool thereby allowing generation of a digital user marking of the first type.

Example 10. The method of any of examples 1-9, wherein the digital user marking comprises a first annotation, a second annotation, and a third annotation associated with the section in the digital version of the document, and wherein superimposing the digital user marking and causing display of the image comprises: causing display of the image, with the first annotation superimposed, in response to the imaging device being within a first distance from the printed version of the document; causing display of the image, with the second annotation superimposed, in response to the imaging device being within a second distance from the printed version of the document; and causing display of the image, with the third annotation superimposed, in response to the imaging device being within a third distance from the printed version of the document.

Example 11. The method of any of examples 1-10, wherein another section of the digital version of the document is associated with a plurality of digital annotations, and wherein the method further comprises: changing an annotation displayed adjacent to, or over, the other section in the image of the printed version of the document, in response to a change in a distance between the imaging device and the printed version of the document.

Example 12. The method of any of examples 1-11, wherein the digital user marking is a first digital user marking, and wherein the method further comprises: detecting, within the image, a physical user marking on the printed version of the document; generating a second digital user marking that corresponds to the physical user marking; and updating the digital version of the document to incorporate the second digital user marking in the digital version of the document.

Example 13. The method of example 12, wherein the physical user marking comprises a highlight of at least a word within the printed version of the document, and wherein generating the second digital user marking comprises: generating the second digital user marking such that the second digital user marking comprises a digital highlight of the at least the word within the corresponding digital version of the document.

Example 14. The method of any of examples 1-13, wherein the image comprises the printed version of the document located within a background scene, and wherein the method comprises: tracking the printed version of the document, in response to the printed version of the document moving relative to the imaging device and/or relative to the background scene, wherein tracking the printed version of the document comprises one or both of: tracking, using a localization and mapping algorithm, the printed version of the document relative to the background scene, and/or tracking, using an object tracking algorithm, the contents of the printed version of the document, in response to the printed version of the document moving relative to the imaging device.

Example 15. The method of any of examples 1-14, further comprising: anchoring the mapping between the image of the printed version and the digital version, such that the mapping is maintained irrespective of any movement of the printed version of the document relative to the imaging device.

Example 16. A system comprising: one or more processors; an imaging device to capture a stream of images of a physical page that has content physically printed thereon, the content printed on the physical page has a first portion of content; a touch screen display; a user marking system executable by the one or more processors to search and locate a digital version of the content of the physical page, identify a second portion of content within the digital version that matches the first portion of content printed on the physical page; determine that the second portion of content within the digital version has an associated digital annotation, and cause display of, on the touch screen display, the stream of images, wherein the stream of images incorporates the digital annotation next to the display of the first portion of content.

Example 17. The system of example 16, wherein the user marking system is to: determine that a first sentence of the second portion of content is highlighted within the digital version, wherein a first sentence of the first portion of content is not highlighted on the physical page; and cause display of, on the touch screen display, the stream of images of the physical page, with the first sentence of the first portion of content being highlighted.

Example 18. The system of any of examples 16-17, wherein the user marking system is to: receive an input to digitally highlight a third portion of content printed on the physical page; cause display of, on the touch screen display, the image of the third portion of content printed on the physical page, with the third portion of content highlighted in the image, wherein the third portion of content printed on the physical page is not highlighted; identify a fourth portion of content within the digital version that matches the third portion of content printed on the physical page; and update the digital version by adding a digital highlight to the fourth portion of content in the digital version.

Example 19. A computer program product including one or more non-transitory machine-readable mediums encoded with instructions that when executed by one or more processors cause a process to be carried out for sharing user markings between digital and printed versions of a document, the process comprising: capturing an image of a section in the printed version of the document; accessing the digital version of the document; identifying a digital user marking in a section in the digital version of the document, the section in the digital version of the document corresponding to the section in the printed version of the document; superimposing the digital user marking on or near the corresponding section in the image of the printed version of the document; and causing display of the image of the printed version of the document, with the digital user marking superimposed.

Example 20. The computer program product of example 19, wherein the digital user marking is a first digital user marking, and the process comprises: while the image of the printed version is being displayed on a display, generating a second digital user marking, wherein the second digital user marking is marked relative to the image of the printed version of the document; and updating the digital version of the document to incorporate the second digital user marking in the digital version of the document.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for sharing and synchronizing user markings between a digital version and a printed version of a document, the method comprising:

capturing, by an imaging device of an apparatus, a stream of images of the printed version of the document, wherein the stream of images includes an image of a section of the printed version;

while the stream of images is being captured, displaying the stream of images on a display of the apparatus;

accessing the digital version of the document;

mapping between the image of the section of the printed version and the digital version, to identify a section of the digital version that corresponds to the section of the printed version;

identifying a first annotation in the section of the digital version;

superimposing the first annotation in the stream of images;

in response to detecting a change in a distance between the imaging device and the printed version of the document, identifying a second annotation in the section of the digital version, wherein the second annotation is responsive to the first annotation; and superimposing the second annotation in the stream of images.

2. The method of claim 1, further comprising removing the first annotation from the stream of images before superimposing the second annotation in the stream of images.

3. The method of claim 1, further comprising:

causing display of, on the display, a cursor, wherein a position of the cursor is fixed relative to the display; and in response to the cursor hovering over a segment within the section of the printed version, causing selection of an entirety of the segment.

4. The method of claim 3, wherein causing selection of the entirety of the segment comprises:

determining a structure of the digital version using metadata included in the digital version;

based on the structure of the digital version, determining a structure of the printed version; and identifying, using the structure of the printed version, the entirety of the segment in response to the cursor hovering over the segment.

5. The method of claim 1, further comprising displaying a cursor at a fixed position within the display even when a user touch is detected at a different position within the display.

6. The method of claim 5, further comprising:

in response to a movement of the imaging device relative to the printed version, causing the stream of images to move relative to the display, such that the stream of images also moves relative to the cursor; and in response to the cursor moving over one or more words within the section of the printed version, causing an initial selection of the one or more words within the section of the printed version.

7. The method of claim 6, further comprising:

extending the initial selection to incorporate an additional one or more words within the section of the printed version, wherein the additional one or more words are adjacent to the initial selection.

8. The method of claim 1, further comprising:

causing display of, on the display, a cursor, wherein a position of the cursor is fixed relative to the display; and in response to a movement of the imaging device relative to the printed version and/or an engagement of a zooming function, marking a path in the stream of images that the cursor takes over the printed version during the movement or the engagement of the zooming function.

9. The method of claim 1, further comprising:

causing display of, on the display, a user interface including a plurality of tools, the plurality of tools including a first tool to generate a first type of digital user marking, wherein the plurality of tools is anchored to the printed version within the stream of images;

causing display of, on the display, a cursor, wherein a position of the cursor is fixed relative to the display; and in response to the cursor hovering over the first tool for at least a threshold period of time, selecting the first tool, thereby allowing the first type of digital user marking to be received.

10. The method of claim 1, further comprising:

receiving, via the display, a digital user marking that is marked relative to the image; and updating the digital version to incorporate the digital user marking in the section of the digital version.

11. The method of claim 1, wherein when the first annotation is superimposed in the stream of images, it is displayed in a first user interface that includes a user interface element;

when selected, the user interface element causes a second user interface to be displayed; and the second user interface includes a text entry field configured to receive the second annotation.

12. The method of claim 1, further comprising receiving, via the display, a digital user marking that is marked relative to the image.

13. The method of claim 1, further comprising:

detecting, within the image, a physical user marking on the printed version;

generating a digital user marking that corresponds to the physical user marking; and updating the digital version to incorporate the digital user marking.

14. The method of claim 1, wherein the image comprises at least one of the printed version located within a background scene, and the method further comprises: tracking the printed version in response to the printed version moving relative to the imaging device and/or relative to the background scene, wherein tracking the printed version comprises one or both of:

tracking, using a localization and mapping algorithm, the printed version relative to the background scene, and/or tracking, using an object tracking algorithm, contents of the printed version, in response to the printed version moving relative to the imaging device.

15. The method of claim 1, wherein a mapping between the image of the section of the printed version and the digital version is maintained irrespective of any movement of the printed version relative to the imaging device.

16. A computer program product including one or more non-transitory machine-readable mediums encoded with instructions that when executed by one or more processors cause a process to be carried out for sharing user markings between a digital version and a printed version of a document, the process comprising:

capturing, by an imaging device of an apparatus, a stream of images of the printed version of the document, wherein the stream of images includes an image of a section of the printed version;

while the stream of images is being captured, displaying the stream of images on a display of the apparatus;

accessing the digital version of the document;

mapping between the image of the section of the printed version and the digital version, to identify a section of the digital version that corresponds to the section of the printed version;

while capturing the stream of images, and while the stream of images is being displayed, receiving, via the display, a digital user marking that is marked relative to the image, wherein receiving the digital user marking further comprises causing display of a cursor at a fixed position on the display, in response to a movement of the imaging device relative to the printed version, causing the stream of images to move relative to the display, such that the stream of images also moves relative to the cursor, and in response to the cursor moving over one or more selected words within the section of the printed version, causing an initial selection of the one or more selected words within the section of the printed version while leaving one or more unselected words within the section of the printed version unselected; and updating the digital version to incorporate the digital user marking in the section of the digital version.

17. The computer program product of claim 16, wherein the stream of images is displayed with the digital user marking superimposed in the stream of images.

18. An apparatus comprising:

one or more processors;

an imaging device;

a display; and a user marking system executable by the one or more processors to capture, by the imaging device, a stream of images of a printed version of a document, wherein the stream of images includes an image of a section of the printed version, while the stream of images is being captured, display the stream of images on the display, access a digital version of the document, map between the image of the section of the printed version and the digital version, to identify a section of the digital version that corresponds to the section of the printed version, while capturing the stream of images, and while the stream of images is being displayed, receive, via the display, a digital user marking that is marked relative to the image, update the digital version to incorporate the digital user marking in the section of the digital version, identify an annotation in the section of the digital version, superimpose the annotation in the stream of images, and modify the annotation in response to a change in a distance between the imaging device and the printed version.

19. The apparatus of claim 18, wherein modifying the annotation further comprises identifying a responsive an annotation in the section of the digital version, wherein the responsive annotation is responsive to the annotation.

20. The apparatus of claim 18, wherein the annotation is displayed in a first user interface that includes a user interface element;

when selected, the user interface element causes a second user interface to be displayed, and the second user interface includes a text entry field configured to receive a responsive annotation that is responsive to the annotation.

* * * * *